United States Patent
Yang et al.

(10) Patent No.: US 12,095,493 B2
(45) Date of Patent: Sep. 17, 2024

(54) METHOD FOR DETECTING A PROXIMITY OF OBJECTS AND ELECTRONIC DEVICE SUPPORTING THE SAME

(71) Applicant: Samsung Electronics Co., Ltd., Suwon-si (KR)

(72) Inventors: Dongil Yang, Suwon-si (KR); Jonghun Yoo, Suwon-si (KR); Woonyun Kim, Suwon-si (KR); Hyoseok Na, Suwon-si (KR); Hanyeop Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 17/422,624

(22) PCT Filed: Jun. 1, 2021

(86) PCT No.: PCT/KR2021/006806
§ 371 (c)(1),
(2) Date: Jul. 13, 2021

(87) PCT Pub. No.: WO2022/005031
PCT Pub. Date: Jan. 6, 2022

(65) Prior Publication Data
US 2022/0345167 A1     Oct. 27, 2022

(30) Foreign Application Priority Data
Jul. 1, 2020   (KR) .................. 10-2020-0080959

(51) Int. Cl.
*H04B 1/3827*     (2015.01)
*H04W 52/18*      (2009.01)

(52) U.S. Cl.
CPC .......... *H04B 1/3838* (2013.01); *H04W 52/18* (2013.01)

(58) Field of Classification Search
CPC ...... H04B 1/3838; H04B 1/04; H04B 1/3827; H04B 17/10; H04B 17/102; H04B 17/101;
(Continued)

(56) References Cited

U.S. PATENT DOCUMENTS 6,590,538 B1   7/2003   Koyanagi et al.
7,994,989 B2 *  8/2011   Young ................ H01Q 9/145
                                                         343/702
(Continued)

FOREIGN PATENT DOCUMENTS

EP    3 484 059 A2     5/2019
JP    2000-286924      10/2000
(Continued)

OTHER PUBLICATIONS

International Search Report and Written Opinion issued Sep. 16, 2021 in corresponding International Application No. PCT/KR2021/006806.
(Continued)

*Primary Examiner* — Ankur Jain
(74) *Attorney, Agent, or Firm* — Nixon & Vanderhye P.C.

(57) ABSTRACT

The disclosure relates to a method of detecting whether an external object is in proximity to an electronic device and an electronic device supporting the same. An electronic device according to an embodiment may include: a wireless communication circuit; an antenna electrically connected to the wireless communication circuit and configured to be fed with power from the wireless communication circuit at a first point; a voltage detector including circuitry configured to detect a peak voltage applied to the antenna; and a processor electrically connected to the voltage detector and the wireless communication circuit. The processor may be configured to: determine whether an external object is within (Continued)

a specified proximity to the electronic device based on the peak voltage detected by the voltage detector; and control the magnitude of power applied to the antenna via the wireless communication circuit based on a determination that the external object is within the specified proximity to the electronic device.

15 Claims, 14 Drawing Sheets

(58) Field of Classification Search
CPC .......... H04B 2001/0416; H04W 52/18; H04W 52/283
See application file for complete search history.

(56) References Cited

U.S. PATENT DOCUMENTS

| | | | |
|---|---|---|---|
| 8,798,695 | B1 | 8/2014 | Zheng et al. |
| 9,374,655 | B1* | 6/2016 | Lee .......................... H04W 4/80 |
| 2009/0256761 | A1* | 10/2009 | Young .................... H01Q 1/242 |
| | | | 343/702 |
| 2010/0321096 | A1 | 12/2010 | Sudjian |
| 2013/0210477 | A1 | 8/2013 | Peter |
| 2014/0009171 | A1 | 1/2014 | Ujvari |
| 2015/0162943 | A1 | 6/2015 | Peter |
| 2015/0382307 | A1 | 12/2015 | Harper et al. |
| 2016/0105854 | A1 | 4/2016 | Lee |
| 2016/0247057 | A1 | 8/2016 | Lee et al. |
| 2017/0085120 | A1 | 3/2017 | Leabman et al. |
| 2018/0062684 | A1* | 3/2018 | Kim ........................ H01Q 1/245 |
| 2019/0149196 | A1* | 5/2019 | Hueber .............. G06K 7/10297 |
| | | | 340/10.1 |
| 2019/0283616 | A1* | 9/2019 | Upward .................. H02J 50/80 |
| 2020/0044612 | A1 | 2/2020 | Bologna et al. |

FOREIGN PATENT DOCUMENTS

| | | |
|---|---|---|
| KR | 10-1417725 | 7/2014 |
| KR | 10-2016-0043394 | 4/2016 |
| KR | 10-2016-0103354 | 9/2016 |
| KR | 10-2018-0025710 | 3/2018 |

OTHER PUBLICATIONS

Extended European Search Report dated Oct. 9, 2023 for EP Application No. 21832589.2.

* cited by examiner

METHOD FOR DETECTING A PROXIMITY OF OBJECTS AND ELECTRONIC DEVICE SUPPORTING THE SAME

CROSS-REFERENCE TO RELATED APPLICATION(S)

This application is based on and claims priority under 35 U.S.C. 371 to PCT/KR2021/006806 filed Jun. 1, 2021, which claims priority to Korean Patent Application No. 10-2020-0080959, filed on Jul. 1, 2020, in the Korean Intellectual Property Office, the disclosure of each are herein incorporated by reference in their entirety.

BACKGROUND

Field

The disclosure relates to a method of detecting whether an object is in proximity to an electronic device and an electronic device supporting the same.

Description of Related Art

An electromagnetic wave absorptance (specific absorption rate (SAR)) refers to the amount of electromagnetic wave energy absorbed by a human body per unit mass due to electromagnetic waves generated from an electronic device. When the value of the specific absorption rate measured while using an electronic device is large, the user's body may be adversely affected.

In each country, the specific absorption rate with respect to a user's body is regulated such that the rate should not exceed a standard value. Electronic device manufacturers adjust the peak power of wireless signals transmitted from electronic devices to meet the specific absorption rate standard (hereinafter, referred to as an "SAR standard").

An electronic device may meet the SAR standard by detecting whether an external object (e.g., a user's body) is in proximity to or in contact with the electronic device using a grip sensor and lowering the peak power of wireless signals to be transmitted to be equal to or lower than a predetermined value when it is determined that the external object is in proximity or in contact.

However, it is necessary to secure, in the electronic device, a space for arranging the grip sensor and a circuit electrically connected to the grip sensor, which may reduce the space for arranging other electronic components inside the electronic device and make a circuit configuration complicated.

In addition, when the grip sensor is arranged to be electrically connected to at least one area of a metal frame of the electronic device operating as an antenna radiator, the radiation performance of the metal frame may be degraded by the grip sensor, which is electrically connected to the metal frame.

SUMMARY

Embodiments of the disclosure provide a method for detecting whether an external object is in proximity to or in contact with an electronic device without using a grip sensor, and an electronic device supporting the same.

An electronic device according to an example embodiment may include: a wireless communication circuit; an antenna electrically connected to the wireless communication circuit and configured to be fed with power from the wireless communication circuit at a first point; a voltage detector including circuitry configured to detect a peak voltage applied to the antenna; and a processor electrically connected to the voltage detector and the wireless communication circuit. The processor may be configured to: determine whether an external object is within a specified proximity to the electronic device based on the peak voltage detected by the voltage detector; and control a magnitude of power applied to the antenna via the wireless communication circuit based on a determination that the external object is within the specified proximity to the electronic device.

An electronic device according to an example embodiment may include: a wireless communication circuit; an antenna electrically connected to the wireless communication circuit and configured to be fed with power from the wireless communication circuit at a first point; a switch circuit electrically connected to the antenna and configured to adjust an electrical length of the antenna; a voltage detector including circuitry configured to detect a peak voltage applied to the switch circuit; and a processor electrically connected to the voltage detector and the wireless communication circuit. The processor may be configured to: determine whether an external object is within a specified proximity to the electronic device based on the peak voltage detected by the voltage detector; and control the magnitude of power applied to the antenna via the wireless communication circuit based on a determination that the external object is within the specified proximity to the electronic device.

A method according to an example embodiment may include: detecting a peak voltage applied to an antenna via a voltage detector; determining whether an external object is within a specified proximity to an electronic device based on the detected peak voltage; and adjusting the magnitude of power applied to the antenna via a wireless communication circuit electrically connected to the antenna based on a determination that the external object is within the specified proximity to the electronic device.

With an electronic device according to various embodiments, it is possible to detect whether an external object (e.g., a user's body) is in proximity (the term "proximity" as used herein may be used interchangeably with the term "within a specified proximity") to the electronic device without using a grip sensor.

With an electronic device according to various embodiments, it is possible to secure a mounting space for arranging electronic components and to reduce circuit complexity.

With an electronic device according to various embodiments, it is possible to suppress antenna performance degradation caused by a grip sensor.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
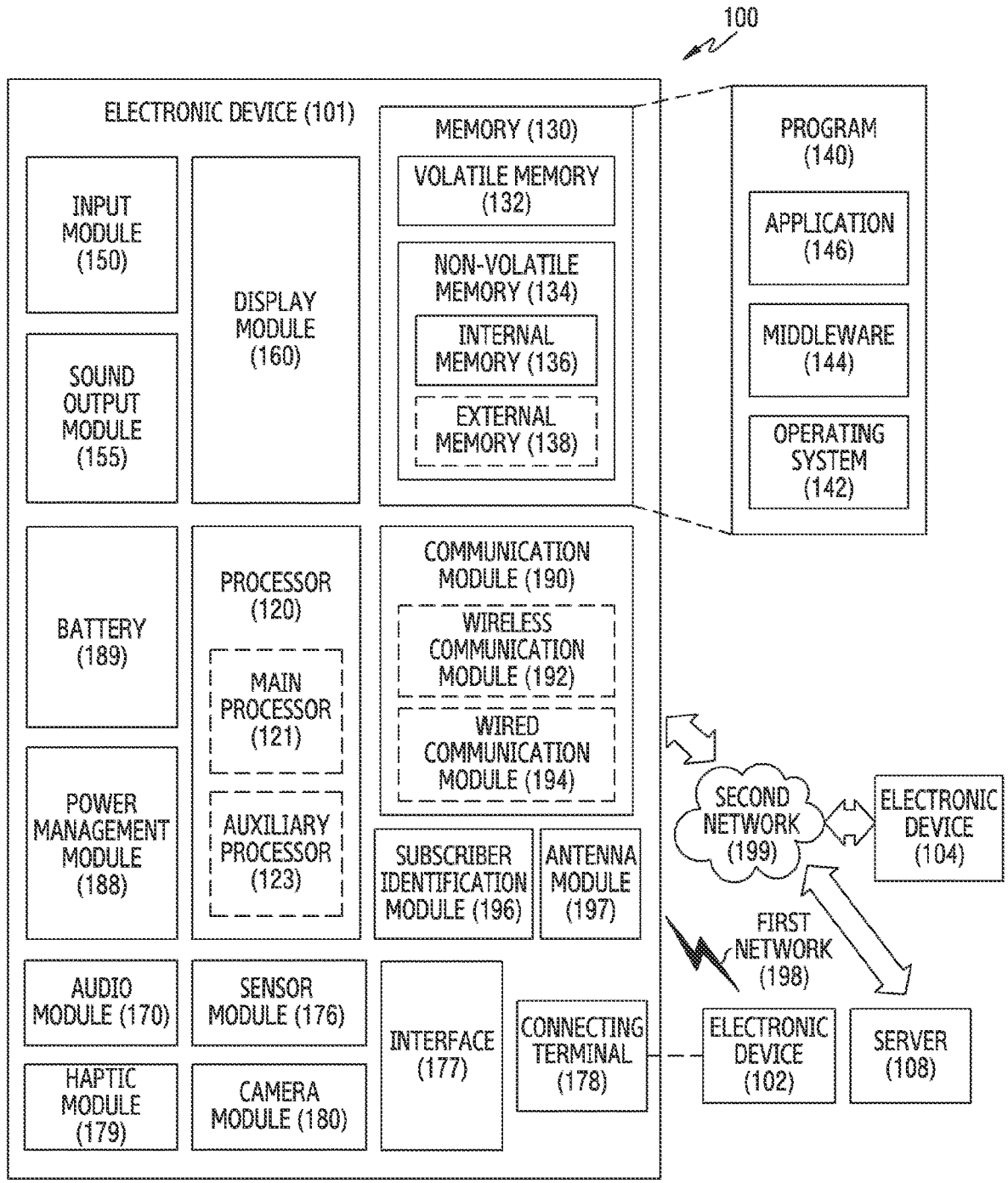
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of e) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
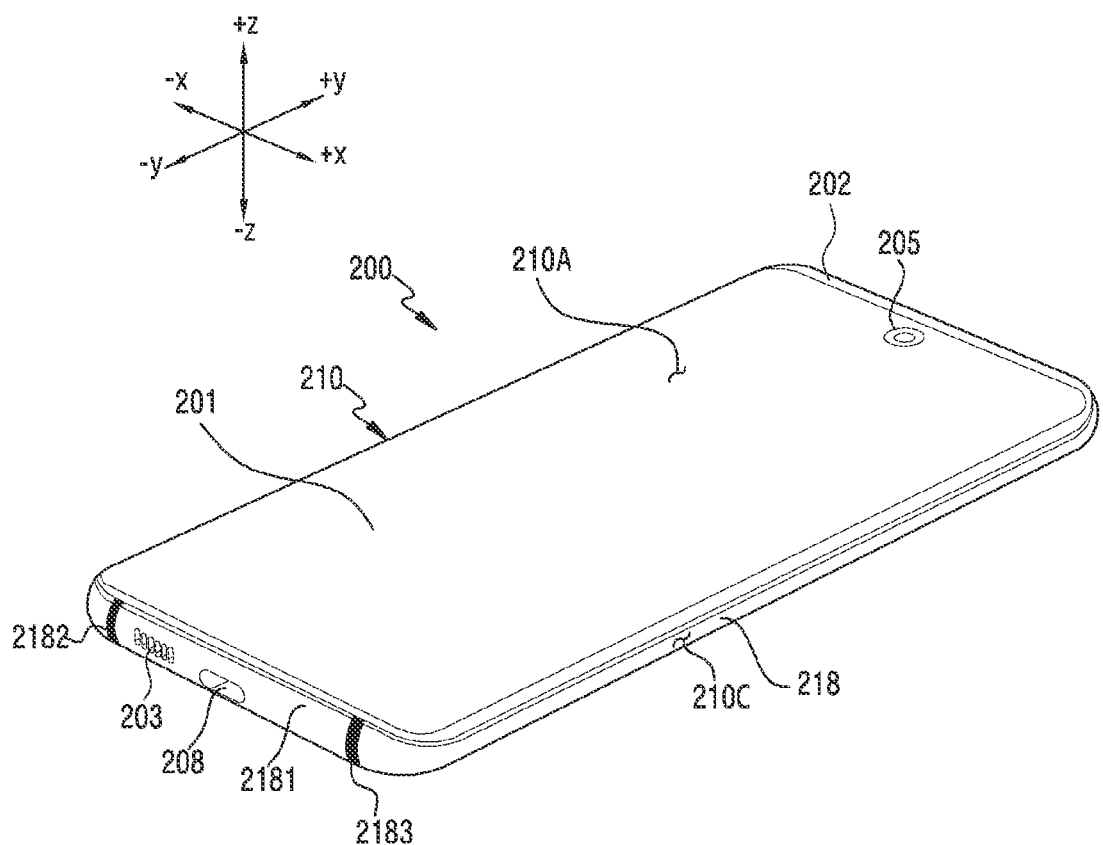
FIG. 2A is a front perspective view of an electronic device according to various embodiments.
Figure 2B:
FIG. 2B is a rear perspective view of the electronic device of FIG. 2A.

FIG. 2A is a front perspective view of an electronic device 200 according to various embodiments, and FIG. 2B is a rear perspective view of the electronic device 200 of FIG. 2A.

Referring to FIGS. 2A and 2B, the electronic device 200 (e.g., the electronic device 101 in FIG. 1) according to an embodiment may include a housing 210 including a first surface (or a "front surface) 210A, a second surface (or a "rear surface") 210B, and a side surface (a "side wall") 210C surrounding a space between the first surface 210A and the second surface 210B. In an embodiment (not illustrated), the term "housing 210" may refer to a structure forming a part of the first surface 210A, the second surface 210B, and the side surface 210C of FIGS. 2A and 2B.

According to an embodiment, at least a portion of the first surface 210A may be defined by a substantially transparent front plate 202 (or a "cover window") (e.g., a glass plate or a polymer plate including various coating layers). According to an embodiment, the front plate 202 may include a curved portion bent and extending seamlessly from the first surface 210A towards the rear plate 211 in at least one side edge portion.

According to an embodiment, the second surface 210B may be defined by a substantially opaque rear plate 211. The rear plate 211 may be made of, for example, coated or colored glass, ceramic, a polymer, or metal (e.g., aluminum, stainless steel (STS), or magnesium), or a combination of two or more of these materials. According to an embodiment, the rear plate 211 may include a curved portion bent and extending seamlessly from the second surface 210B towards the front plate 202 in at least one side edge portion.

According to an embodiment, the side surface 210C may be defined by a side member (or a "bracket") 218 coupled to the front plate 202 and the rear plate 211 and including a metal and/or a polymer. In various embodiments, the rear plate 211 and the side member 218 may be configured in an integral structure, and may include the same material (e.g., a metal material such as aluminum). In an example, the side member 218 may include a conductive portion 2181 and/or one or more non-conductive portions 2182 and 2183. For example, a first non-conductive portion 2182 may be disposed at one end of the conductive portion 2181 (e.g., the end in the −x direction), and a second non-conductive portion 2183 may be disposed the other end of the conductive portion 2181 (e.g., the end in the +x direction) to insulate the conductive portion 2181. In another example, the conductive portion 2181 may be fed with power from a wireless communication circuit (e.g., the wireless communication module 192 in FIG. 1), and may operate as an antenna radiator for transmitting and/or receiving an RF signal in a predetermined frequency band.

According to an embodiment, the electronic device 200 may include at least one of a display 201, an audio module 203, a sensor module (not illustrated), camera modules 205, 212, 213, 214, 215, and 206, a key input device 217, and/or a connector hole 208. In various embodiments, in the electronic device 200, at least one of the components (e.g., the key input devices 217) may be omitted, or other components may be additionally included.

In various embodiments, the electronic device 200 may further include a light-emitting element, and the light-emitting element may be disposed at a position adjacent to the display 201 in the area provided by the front plate 202. The light-emitting element may provide, for example, the status information of the electronic device 200 in an optical form. In an embodiment, the light-emitting element may provide, for example, a light source that is interlocked with the operation of the camera module 205. The light-emitting element may include, for example, an LED, an IR LED, and/or a xenon lamp.

According to an embodiment, the display 201 may be visible to the outside of the electronic device 200 through a substantial portion of the front plate 202. In various embodiments, the edges of the display 201 may be substantially the same as the contour shape (e.g., the curved surface) of the front plate 202 adjacent thereto. In an embodiment (not illustrated), the distance between the periphery of the display 201 and the periphery of the front plate 202 may be substantially constant in order to enlarge the exposed area of the display 201. In an embodiment (not illustrated), the electronic device 200 may include another electronic component, such as the camera module 205, a proximity sensor (not illustrated), or an illuminance sensor (not illustrated) aligned with a recess or an opening provided in a portion of the screen display area of the display 201.

In an embodiment (not illustrated), the rear surface of the screen display area of the display 201 may include at least one of the camera modules 212, 213, 214, and 215, a fingerprint sensor (not illustrated), and a flash 206. In an embodiment (not illustrated), the display 201 may be coupled to or disposed adjacent to a touch-sensitive circuit, a pressure sensor capable of measuring a touch intensity (pressure), and/or a digitizer configured to detect a magnetic-field-type stylus pen.

According to an embodiment, the audio module 203 may include a microphone hole and/or a speaker hole. The microphone hole may include a microphone disposed therein to acquire external sound. In various embodiments, multiple microphones may be disposed in the microphone hole to detect the direction of sound. In various embodiments, the speaker hole and the microphone hole may be implemented as a single hole, or a speaker (e.g., a piezo speaker) may be included without a speaker hole. The speaker hole may include an external speaker hole and/or a call receiver hole.

According to an embodiment, by including a sensor module (not illustrated), the electronic device 200 may generate an electrical signal or a data value corresponding to an internal operating state or an external environmental condition. For example, the sensor module may further include, for example, a proximity sensor disposed on the first surface 210a of the housing 210, a fingerprint sensor incorporated in or disposed adjacent to the display 201, and/or a biometric sensor (e.g., an HRM sensor) disposed on the second surface 210B of the housing 210. The electronic device 200 may further include at least one of sensor modules (not illustrated in the drawings), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 205, 212, 213, 214, and 206 may include a first camera device 205 disposed on the first surface 210A of the electronic device 200, second camera devices 212, 213, 214, and 215 disposed on the second surface 210B thereof, and/or a flash 206. In an example, each of the camera modules 205, 212, 213, 214, and 215 may include one or more lenses, an image sensor, and/or an image signal processor. In another example, the flash 206 may include a light-emitting diode or a xenon lamp. In various embodiments, two or more lenses (e.g., an infrared camera lens, a wide-angle lens, and a telephoto lens) and image sensors may be disposed on one face of the electronic device 200.

According to an embodiment, the key input devices 217 may be disposed on the side surface 210C of the housing 210. In an embodiment, the electronic device 200 may not include some or all of the above-mentioned key input devices 217, and a key input device 217, which is not included in the above mentioned key input devices, may be implemented in another form, such as a soft key, on the display 201. In various embodiments, the key input devices 217 may include at least a part of a fingerprint sensor disposed on the second surface 210B of the housing 210.

According to an embodiment, the connector hole 208 may accommodate a connector configured to transmit and receive power and/or data to and from an external electronic device, and/or a connector configured to transmit and receive an audio signal to and from an external electronic device. For example, the connector hole 208 may include a USB connector or an earphone jack. In an embodiment, the USB connector and the earphone jack may be implemented with a single hole (e.g., 208 in FIGS. 2A and 2B). According to an embodiment (not illustrated), the electronic device 200 may transmit and receive power and/or data, or may transmit and receive an audio signal with respect to an external electronic device (e.g., the electronic device 102 or 104 in FIG. 1) without a separate connector hole.

Figure 3:
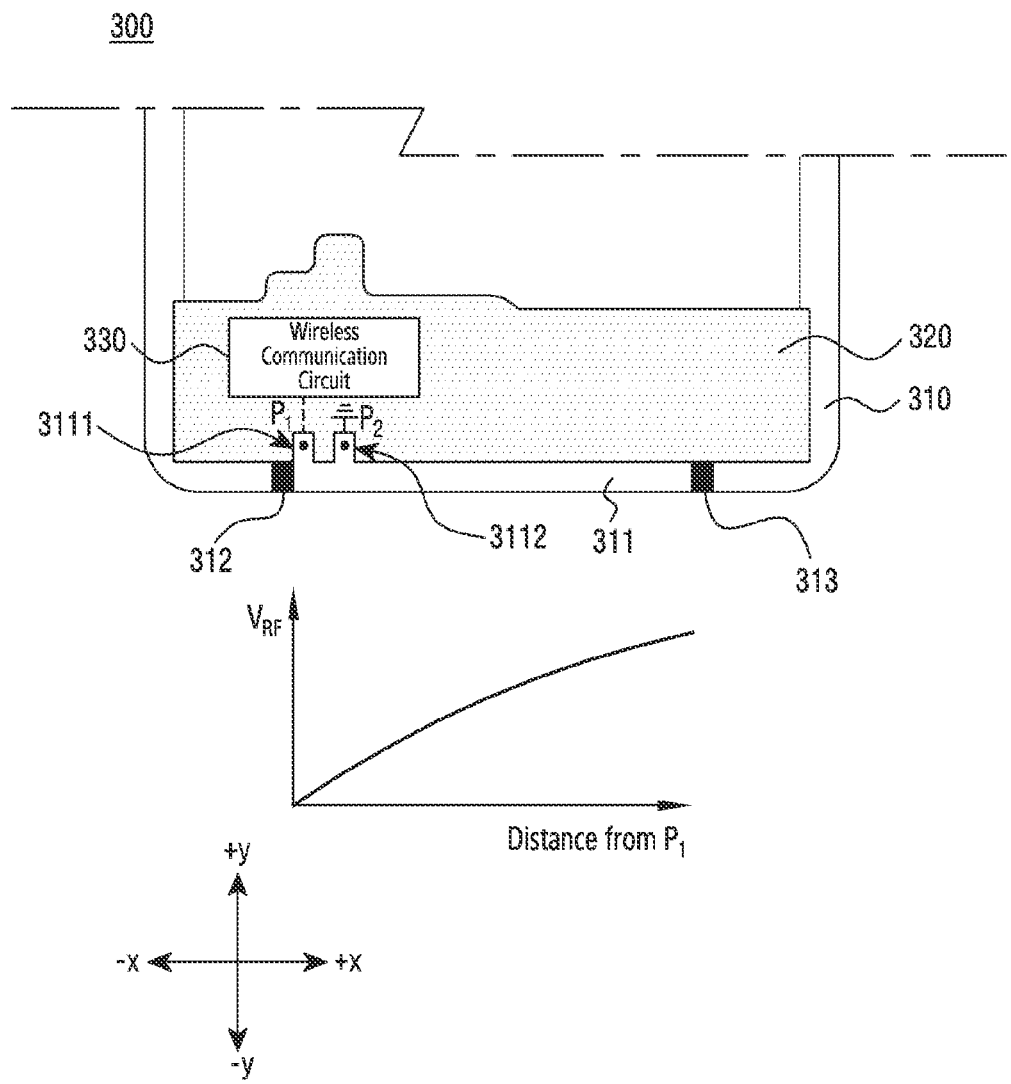
FIG. 3 is a diagram illustrating a partial area of a side member that operates as an antenna radiator of an electronic device according to various embodiments.

FIG. 3 is a diagram illustrating a partial area of a side member that operates as an antenna radiator of an electronic device according to various embodiments.

Referring to FIG. 3, an electronic device 300 (e.g., the electronic device 200 in FIGS. 2A and 2B) according to an embodiment may include a side member (e.g., a side wall) 310 (e.g., the side member 218 in FIG. 2A), a printed circuit board 320 and/or a wireless communication circuit 330 (e.g., a wireless communication module 192 in FIG. 1). At least one of the components of the electronic device 300 according to an embodiment may be the same as or similar to at least one of the components of the electronic device 101 of FIG. 1 or the electronic device 200 of FIGS. 2A and 2B, and redundant descriptions thereof may not be repeated below.

According to an embodiment, the side member 310 may include a side wall and define at least a portion of the side surface (e.g., the side surface 210C in FIG. 2A) of the electronic device 300. In an example, the side member 310 may include a conductive portion 311 (e.g., the conductive portion 2181 in FIG. 2A) and/or one or more non-conductive portions 312 and 313 (e.g., the one or more non-conductive portions 2182 and 2183 in FIG. 2A). For example, the one or more non-conductive portions 312 and 313 may include a first non-conductive portion 312 disposed at one end of the conductive portion 311 (e.g., the end in the −x-axis direction) and/or a second non-conductive portion 313 disposed at the other end of the conductive portion 311 (e.g., the end in the +x-axis direction). As another example, the first non-conductive portion 312 and/or the second non-conductive portion 313 may insulate the conductive portion 311. As another example, the portion of the side member 310 that is in contact with the first non-conductive portion 312 and may be located in the −x-axis direction of the first non-conductive portion 312 or the portion of the side member 310 that is in contact with the second non-conductive portion 313 and may be located in the +x-axis direction of the second non-conductive portion 313 may include a conductive member.

According to an embodiment, the conductive portion 311 of the side member 310 may be electrically connected to a wireless communication circuit 330 and/or a ground of a printed circuit board 320. For example, the conductive portion 311 may be electrically connected to the wireless communication circuit 330 at a first point $P_1$, and may be electrically connected to a ground of the printed circuit board 320 at a second point $P_2$ spaced apart from the first point $P_1$. As another example, depending on the type of the antenna including the conductive portion 311, the conductive portion 311 may not be electrically connected to the ground. For example, in the case of a monopole antenna or a patch antenna, the conductive portion 311 may not be electrically connected to the ground.

In an embodiment, the conductive portion 311 may include one or more protrusions 3111 and 3112 protruding toward the printed circuit board 320. For example, the conductive portion 311 may include a first protrusion 3111 and/or a second protrusion 3112 disposed to be spaced apart from the first protrusion 3111. As another example, the first point $P_1$ may be a point corresponding to at least one area of the first protrusion 3111, and the second point $P_2$ may be a point corresponding to at least one area of the second protrusion 3112. However, the disclosure is not limited thereto.

In an embodiment, the conductive portion 311 may be supplied with power from the wireless communication circuit 330 via the first point $P_1$, and as a result, the conductive portion 311 may serve as an antenna radiator that transmits and/or receives an RF signal of a predetermined frequency band. In an example, since power is supplied to the first point $P_1$ of the conductive part 311, a peak voltage $V_{RF}$ corresponding to the power may be applied to the conductive part 311. As shown in FIG. 3, the magnitude of the peak voltage $V_{RF}$ applied to the conductive portion 311 may increase as the distance of an external object (e.g., a user's body) from the first point $P_1$ increases, which may be illustrated, for example, through Equations 1 to 5 below.

$$dBm = 10 \log, \ mW = 10 \log W + 30 \quad \text{Equation 1}$$

$$W = 10^{dBm/10} \times 0.001 = \frac{V_{RMS}^2}{Z} \quad \text{Equation 2}$$

$$V_{RF}(\text{peak voltage}) = V_{RMS}\sqrt{2} \quad \text{Equation 3}$$

$$V_{RF} = (2 * Z * W)^{0.5} \quad \text{Equation 4}$$

$$V_{max}(V_{RF}) = \quad \text{Equation 5}$$

$$V_{RF} \times \left(1 + \frac{VSWR - 1}{VSWR + 1}\right) = V_{RF} \times (1 + \Gamma) = (2 * Z * W)^{0.5} \times (1 + \Gamma)$$

In Equations 1 to 5 above, W may refer, for example, to power supplied to an antenna (e.g., the conductive portion 311), Z may refer, for example, to the impedance value of the antenna, and $V_{RMS}$ may refer, for example, to an effective value of the voltage applied to the antenna, VSWR may refer, for example, to the voltage standing wave ratio of the antenna, and Γ' Γ may refer, for example, to a reflection coefficient of the antenna.

In an example, the conductive portion 311 may have a higher impedance value as the distance of an external object from the first point $P_1$ increases. Referring to Equation 4 and/or Equation 5, the magnitude of the peak voltage $V_{RF}$ applied to the conductive portion 311 increases as the impedance value increases. Thus, it can be seen that the magnitude of the peak voltage $V_{RF}$ applied to the conductive portion 311 increase as the distance of an external object from the first point $P_1$ increases.

According to an embodiment, the electronic device 300 may detect the peak voltage $V_{RF}$ applied to the conductive portion 311 operating as an antenna radiator, and may detect whether an external object (e.g., a user's body) is in proximity to the electronic device 300 based on the detected peak voltage $V_{RF}$. The operations of detecting the peak voltage $V_{RF}$ of the electronic device 300 and detecting whether an external object is within a specified proximity to the electronic device 300 will be described in greater detail below.

Figure 4:
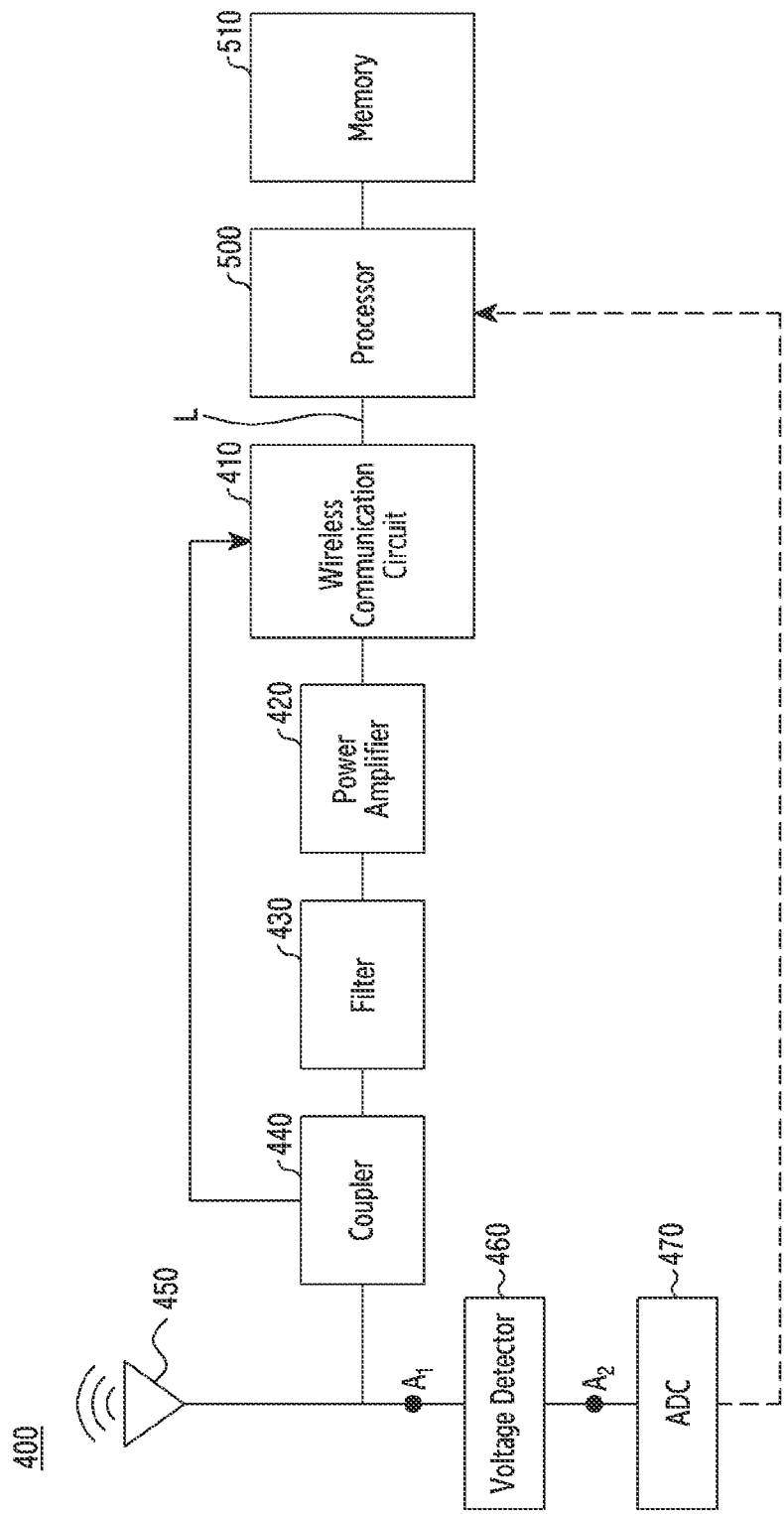
FIG. 4 is a block diagram illustrating an example configuration of an electronic device according to various embodiments.
Figure 5:
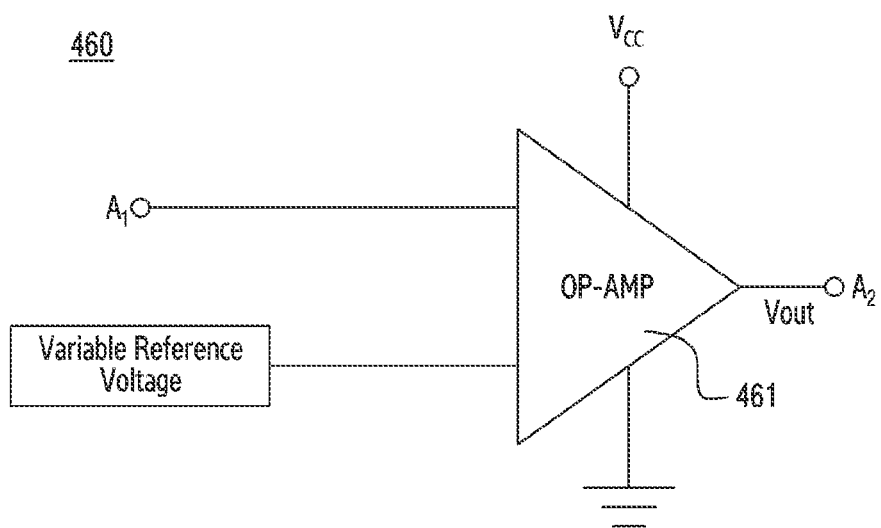
FIG. 5 is a diagram illustrating an example voltage detector of an electronic device according to various embodiments.

FIG. 4 is a block diagram illustrating an example configuration of an electronic device according to various embodiments, and FIG. 5 is a diagram illustrating an example voltage detector of an electronic device according to various embodiments.

Referring to FIGS. 4 and 5, an electronic device 400 (e.g., the electronic device 200 in FIGS. 2A and 2B or the electronic device 300 in FIG. 3) according to an embodiment may include a wireless communication circuit 410 (e.g., the wireless communication circuit 330 in FIG. 3), a power amplifier 420, a filter 430, a coupler 440, an antenna 450, a voltage detector (e.g., including various circuitry) 460, an analog-to-digital converter (ADC) 470, a processor (e.g., including processing circuitry) 500 (e.g., the processor 120 in FIG. 1), and/or a memory 510 (e.g., the memory 130 in FIG. 1).

According to an embodiment, the wireless communication circuit 410 may be electrically connected to the antenna 450 to support wireless communication between the electronic device 400 and an external electronic device (e.g., the electronic device 102 or 104 of FIG. 1). For example, the wireless communication circuit 410 may transmit a radio frequency (RF) signal to an external electronic device by feeding a signal in which power is set to the antenna 450. As another example, the wireless communication circuit 410 may receive an RF signal from an external electronic device through the antenna 450.

According to an embodiment, an electrical path L may be provided between the wireless communication circuit 410 and the antenna 450 to electrically connect the wireless communication circuit 410 and the antenna 450 to each other. On the above-described electrical path L, for example, a power amplifier 420, a filter 430, and/or a coupler 440 may be arranged. In the electronic device 400 according to an embodiment (not illustrated), at least one of the power amplifier 420, the filter 430, or the coupler 440 (e.g., the coupler 440) may be omitted, or another configuration may be added.

In an example, the power amplifier 420 may receive, from the wireless communication circuit 410, and amplify a signal (hereinafter, an "output signal") output from the wireless communication circuit 410 and applied to the antenna 450, and the output signal amplified by the power amplifier 420 may be transmitted to the antenna 450. In another example, the filter 430 may be located between the antenna 450 and the power amplifier 420 to remove or filter out noise of the output signal amplified through the power amplifier 420.

In an example, the coupler 440 may be electrically connected to the antenna 450 and/or the wireless communication circuit 410, and some of the power supplied or applied to the antenna 450 from the wireless communication circuit 410 may be extracted and feedback to the wireless communication circuit 410. In another example, the coupler 440 may extract at least some of the power applied to the antenna 450, and may feedback the extracted power signal to the wireless communication circuit 410. The wireless communication circuit 410 may receive, for example, a power signal obtained by attracting at least some of the power applied to the antenna 450 from the coupler 440, and may adjust the magnitude of the power supplied or applied to the antenna 450 based on the received power signal.

According to an embodiment, the wireless communication circuit 410 may further include a power detection circuit (not illustrated) electrically connected to the coupler 440. In an example, the wireless communication circuit 410 may detect power applied to the coupler 440 via the power detection circuit. In another example, the wireless communication circuit 410 may transmit power data of the power applied to the sensed coupler 440 to the processor 500, and the processor 500 may adjust the magnitude of power applied to the antenna 450 based on the power data received from the wireless communication circuit 410.

According to an embodiment, the antenna 450 may transmit an RF signal to an external electronic device or may receive an RF signal from an external electronic device. In an example, the antenna 450 may, but not exclusively, include a conductive portion (e.g., the conductive portion 311 in FIG. 3) of a side member (e.g., the side member 310 in FIG. 3) that defines at least a portion of the side surface of the electronic device 400. At least a portion of the conductive portion may act as a radiator of the antenna 450. As another example, the antenna 450 may, but not exclusively, include a planar inverted-F antenna (PIFA), a patch antenna, a laser direct structuring (LDS) antenna, a slot antenna, or the like.

According to an embodiment, the voltage detector 460 may include various circuitry and detect the peak voltage $V_{RF}$ (e.g., $V_{RF}$ in FIG. 3) applied to the antenna 450. In an example, as the output signal supplied to the antenna 450 is transmitted to the antenna 450 via the electrical path L between the wireless communication circuit 410 and the antenna 450, a voltage may be applied to the antenna 450. In another example, the voltage detector 460 may be electrically connected to the antenna 450 to detect the peak voltage $V_{RF}$ applied to the antenna 450. In another example, the voltage detector 460 may be electrically connected to the processor 500, may detect the peak voltage $V_{RF}$ applied to the antenna 450, and may transmit the data of the detected peak voltage $V_{RF}$ to the processor 500. For example, the processor 500 may include various processing circuitry, such as, for example, and without limitation, an application processor, a communication processor, or the like.

In an example, the analog-to-digital converter 470 may convert the peak voltage $V_{RF}$ applied to the antenna 450 and received from the voltage detector 460 into a digital signal, and the converted digital signal may be transmitted to the processor 500.

Referring to FIG. 5, in an example, the voltage detector 460 may, for example, be a circuit including an operational amplifier (OP-AMP) 461. For example, a first path $A_1$ may be provided between the operational amplifier 461 and the antenna 450 to electrically connect the operational amplifier 461 and the antenna 450. As another example, a second path $A_2$ may be provided between the operational amplifier 461 and the analog-to-digital converter 470 to electrically connect the operational amplifier 461 and the analog-to-digital converter 470. In an example, a driving voltage $V_{cc}$ (or a "rated voltage") may be applied to the operational amplifier 461, and by the driving of the operational amplifier 461, the peak voltage $V_{RF}$ input to the operational amplifier 461 via the first path $A_1$ and applied to the antenna 450 may be transmitted to the analog-to-digital converter 470 via the second path $A_2$.

In another example, the operational amplifier 461 may compare the peak voltage $V_{RF}$ applied to the antenna 450 and input via the first path $A_1$ with a predetermined variable reference voltage, and when the peak voltage $V_{RF}$ applied to the antenna 450 is greater than the predetermined variable reference voltage, the operational amplifier 461 may transmit, to the analog-to-digital converter 470, a voltage corresponding to the driving voltage (or a "rated voltage) rather than the peak voltage $V_{RF}$ applied to the antenna 450. For example, when the peak voltage $V_{RF}$ greater than the predetermined variable reference voltage is transmitted to the analog-to-digital converter 470, damage to a circuit or the analog-to-digital converter 470 may occur. When the peak voltage $V_{RF}$ applied to the antenna 450 is greater than the predetermined variable reference voltage, the operational amplifier 461 according to an embodiment is capable of preventing and/or reducing damage to a circuit or the analog-to-digital converter 470 by transmitting a voltage corresponding to the driving voltage (or a "rated voltage") to the analog-to-digital converter 470. In the drawings, an example embodiment in which the voltage detector 460 is a circuit including the operational amplifier 461 is described, but the configuration of the voltage detector 460 is not limited to the illustrated embodiment.

According to an embodiment, the processor 500 may be electrically connected to the wireless communication circuit 410. In an example, the processor 500 may include various processing circuitry and control wireless communication of the electronic device 400 using the wireless communication circuit 410. For example, the processor 500 may adjust the magnitude of power supplied to the antenna 450 via the wireless communication circuit 410.

According to an embodiment, the processor 500 may be electrically connected to the voltage detector 460. For example, the processor 500 may be electrically connected to the voltage detector 460 via the analog-to-digital converter 470, and may receive the data of the peak voltage $V_{RF}$ applied to the antenna 450 converted into a digital signal from the analog-to-digital converter 470.

In an embodiment, the processor 500 may determine whether an external object is in proximity (e.g., within a specified proximity or distance) to the electronic device 400 based on the peak voltage $V_{RF}$ applied to the antenna 450. The external object may include, for example, a user's body, but is not limited thereto.

In an example, the processor 500 may be electrically connected to the memory 510, and the memory 510 may store data about the predetermined peak voltage $V_{RF}$ range of the antenna 450 corresponding to the magnitude of the power applied to the antenna 450. For example, the memory 510 may, but not exclusively, store data about the predetermined peak voltage $V_{RF}$ range of the antenna 450 corresponding to the magnitude of power applied to the antenna 450 in a look-up table.

According to an embodiment, the processor 500 may determine whether an external object is in proximity to the electronic device by comparing the peak voltage $V_{RF}$ applied to the antenna 450 and received from the voltage detector 460 and/or the analog-to-digital converter 470 and the predetermined peak voltage $V_{RF}$ range stored in the memory 510 and corresponding to the magnitude of power applied to the antenna 450. The description, "an external object is in proximity to an electronic device", may include the case in which an external object is disposed at a position adjacent to the electronic device 400 and/or the case in which an external object is in contact with the electronic device 400, and the corresponding descriptions may also be used in substantially the same manner in the following.

In an example, the processor 500 may compare the peak voltage $V_{RF}$ applied to the antenna 450 and the predetermined peak voltage $V_{RF}$ range, and when it is determined that the peak voltage $V_{RF}$ applied to the antenna 450 is out of the predetermined peak voltage $V_{RF}$ range, the processor 500 may determine that the external object is in proximity to (e.g., within a specified proximity or distance) the electronic device 400. For example, when an external object is not in proximity to the electronic device 400, the peak voltage $V_{RF}$ applied to the antenna 450 may be included within the predetermined peak voltage $V_{RF}$ range. As another example, when an external object is in proximity to the electronic device 400, the impedance of the antenna 450 may be changed due to the external object, and when the impedance of the antenna 450 is changed, the peak voltage $V_{RF}$ applied to the antenna 450 may be out of the predetermined peak voltage $V_{RF}$ range. According to an embodiment, the electronic device 400 is capable of determining whether an external object is in proximity to the electronic device 400 based on a change in the peak voltage $V_{RF}$ applied to the antenna 450 depending on whether the external object is in proximity to the electronic device 400. Thus, the electronic device 400 is capable of detecting whether an external object is in proximity without including a grip sensor.

In an embodiment, the processor 500 may adjust the magnitude of power supplied to the antenna 450 based on the determination that an external object is in proximity to the electronic device 400. For example, when it is determined that an external object is in proximity to the electronic device 400, the processor 500 may reduce the magnitude of power supplied or applied to the antenna 450. According to an embodiment, the electronic device 400 may meet the electromagnetic wave absorptance standard (or "specific absorption rate (SAR) standard") through the above-described operation of the processor 500.

In an embodiment, the processor 500 may determine whether the power supplied to the antenna 450 is adjusted based on the power applied to the coupler 440. In an example, the wireless communication circuit 410 may detect power applied to the coupler 440 via a power detection circuit, and power data of the detected power applied to the coupler 440 may be transmitted to the processor 500. For example, some of the power applied to the coupler 440 may be transmitted to the wireless communication circuit 410. In another example, the processor 500 may determine whether the power supplied or applied to the antenna 450 has been adjusted by comparing the power data of the power applied to the coupler 440 and received from the wireless communication circuit 410 with a predetermined coupler 440 power value corresponding to the power applied to the antenna 450. For example, the memory 510 may store the predetermined coupler 440 power value corresponding to the power applied to the antenna 450, and the processor 500 may compare the predetermined coupler 440 power value stored in the memory 510 with the power data of the power applied to the coupler 440 and received from the wireless communication circuit 410.

In an example, the processor 500 may determine whether the magnitude of the power supplied to the antenna 450 has been adjusted to the predetermined magnitude of power by determining whether the power data of the power applied to the coupler 440 corresponds to the predetermined coupler 440 power value stored in the memory 510 and corresponding to the power applied to the antenna 450. In another example, when it is determined that the power data of the power applied to the coupler 440 does not correspond to the predetermined coupler 440 power value, the processor 500 may adjust again the magnitude of the power supplied to the antenna 450.

Figure 6:
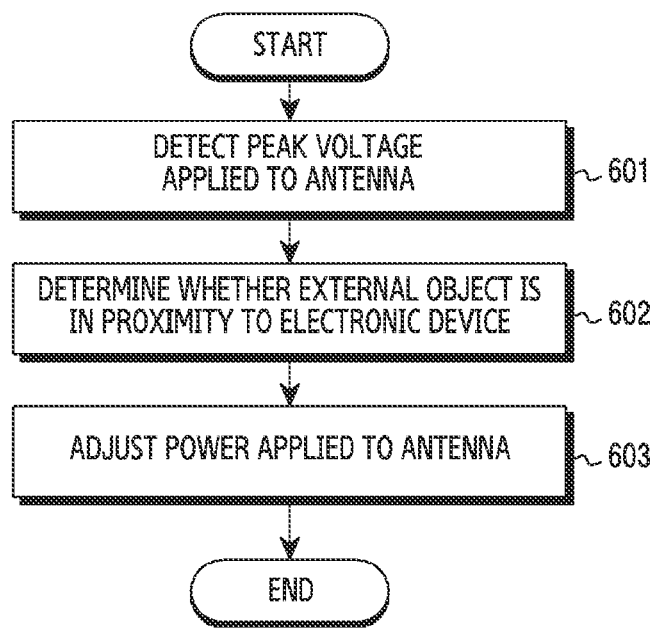
FIG. 6 is a flowchart illustrating an example operation of detecting whether an object is in proximity to an electronic device and adjusting power applied to an antenna according to various embodiments.

FIG. 6 is a flowchart illustrating an example operation of detecting whether an external object is in proximity to (e.g., within a specified proximity or distance of) an electronic device and adjusting power applied to an antenna according to various embodiments. Hereinafter, in describing the operations of detecting whether an object is in proximity to an electronic device and adjusting the power applied to the antenna with reference to FIG. 6, the configuration illustrated in FIG. 4 described above will be referred to.

Referring to FIG. 6, in operation 601, the electronic device 400 (e.g., the electronic device 400 in FIG. 4) according to an embodiment may detect the peak voltage $V_{RF}$ applied to the antenna 450 (e.g., the antenna 450 in FIG. 4) using the voltage detector 460 (e.g., the voltage detector 460 in FIG. 4) electrically connected to the antenna 450 (e.g., the antenna 450 in FIG. 4). In an example, the data of the peak voltage $V_{RF}$ applied to the antenna 450 and obtained through the voltage detector 460 may be transmitted to the processor 500 (e.g., the processor 500 in FIG. 4) electrically connected to the voltage detector 460.

In operation 602, the processor 500 of the electronic device 400 according to an embodiment may determine whether an external object (e.g., a user's body) is in proximity to the electronic device 400 based on the peak voltage $V_{RF}$ applied to the antenna 450 and detected in operation 601. For example, when an external object is in proximity to the electronic device 400, the impedance value of the antenna 450 may be changed. As another example, as the impedance value of the antenna 450 is changed, the peak voltage $V_{RF}$ applied to the antenna 450 may also be changed relative to the power supplied or applied to the antenna 450. In an embodiment, the processor 500 may detect whether an external object is in proximity to the electronic device 400 by comparing the peak voltage $V_{RF}$ applied to the antenna 450 with the predetermined peak voltage $V_{RF}$ range stored in the memory 510 (e.g., the memory 510 of FIG. 4) and corresponding to the power applied to the antenna 450. For example, the processor 500 may determine that an external object is not in proximity to the electronic device 400 when the peak voltage $V_{RF}$ applied to the antenna 450 falls within the predetermined peak voltage $V_{RF}$ range corresponding to the power applied to the antenna 450. As another example, the processor 500 may determine that an external object is in proximity with the electronic device 400 when the peak voltage $V_{RF}$ applied to the antenna 450 is out of the predetermined peak voltage $V_{RF}$ range corresponding to the power applied to the antenna 450. For example, when the peak voltage $V_{RF}$ applied to the antenna 450 is greater than the maximum value of the predetermined peak voltage $V_{RF}$ range or less than the minimum value of the predetermined peak voltage $V_{RF}$ range, the processor 500 may determine that an external object is in proximity to the electronic device 400.

In operation 603, the processor 500 of the electronic device 400 according to an embodiment may adjust the power applied to the antenna 450 based on the determination as to whether an external object is in proximity to the electronic device in operation 602. In an example, when it is determined in operation 602 that the external object is in proximity to the electronic device 400, the processor 500 may reduce the magnitude of the power applied to the antenna 450. In another example, when it is determined in operation 602 that an external object is not in proximity to the electronic device, the processor 500 may maintain the magnitude of power applied to the antenna 450. According to an embodiment, when it is determined that an external object is in proximity to the electronic device 400 through operations 601 to 603, the electronic device 400 may reduce the power applied to the antenna 450. Accordingly, the electronic device 400 may satisfy the electromagnetic wave absorptance standard (or the "specific absorption rate (SAR) standard").

Figure 7:
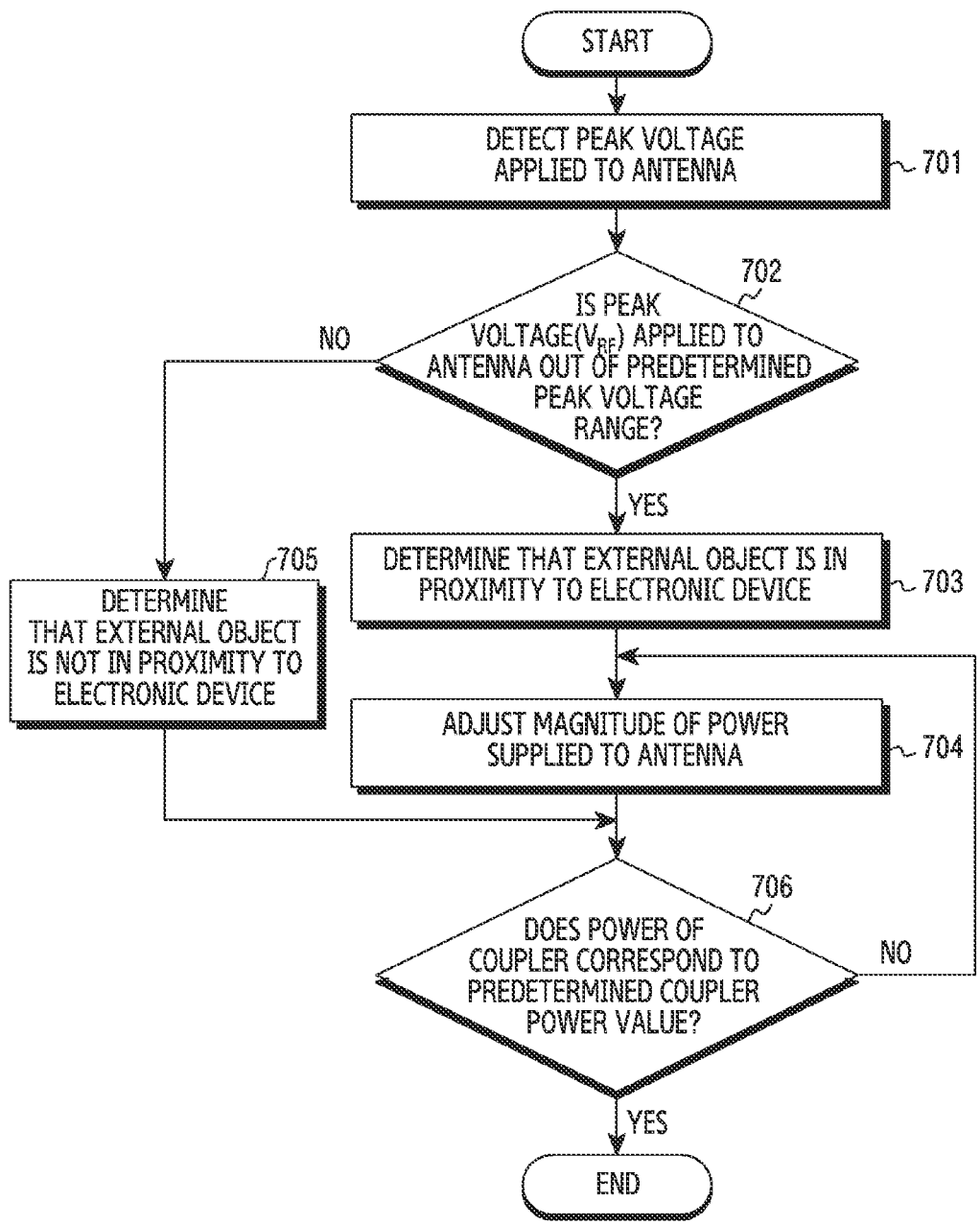
FIG. 7 is a flowchart illustrating an example operation of detecting whether an object is in proximity to an electronic device and adjusting power applied to an antenna according to various embodiments.

FIG. 7 is a flowchart illustrating an example operation of detecting whether an external object is in proximity to an electronic device and adjusting power applied to an antenna according to various embodiments. Hereinafter, in describing the operations of detecting whether an object is in proximity to an electronic device and adjusting the power applied to the antenna with reference to FIG. 7, the configuration illustrated in FIG. 4 will be referred to.

Referring to FIG. 7, in operation 701, the electronic device 400 according to an embodiment may detect the peak voltage $V_{RF}$ applied to the antenna 450 (e.g., the antenna 450 in FIG. 4) using the voltage detector 460 (e.g., the voltage detector 460 in FIG. 4). In an example, as power is supplied or applied to the antenna 450 via the wireless communication circuit 410 (e.g., the wireless communication circuit 410 in FIG. 4), an AC voltage may be applied to the antenna 450. In another example, the voltage detector 460 may be electrically connected to the antenna 450 to detect the peak voltage $V_{RF}$ applied to the antenna 450.

In operation 702, the processor 500 (e.g., the processor 500 in FIG. 4) of the electronic device 400 according to an embodiment may compare the peak voltage $V_{RF}$ applied to the antenna 450 and detected in operation 701 with the predetermined peak voltage $V_{RF}$ range corresponding to the power applied to the antenna 450. In an example, the processor 500 may receive the data of the peak voltage $V_{RF}$ applied to the antenna 450 from the voltage detector 460. In another example, the processor 500 may compare the received peak voltage $V_{RF}$ data applied to the antenna 450 with the range of the peak voltage $V_{RF}$ stored in the memory 510 (e.g., the memory 510 in FIG. 4) and corresponding to the power applied to the antenna 450, and may determine whether the peak voltage $V_{RF}$ applied to the antenna 450 is out of the predetermined peak voltage $V_{RF}$ range.

TABLE 1

| Power (dBm) | Average $V_{RF}$ (Voltage) | $V_{RF}$ min. (Voltage) | $V_{RF}$ max. (Voltage) | Range of $V_{RF}$ (Voltage) | Coupler power (dBm) |
|---|---|---|---|---|---|
| 34 | 31.7 | 28.44 | 34.96 | 28.44-34.96 | 4 |
| 32 | 25.18 | 22.59 | 27.77 | 22.59-27.77 | 2 |
| 30 | 20 | 17.945 | 22.055 | 17.945-22.055 | 0 |
| 28 | 15.89 | 14.255 | 17.525 | 14.255-17.525 | -2 |
| 26 | 12.62 | 11.32 | 13.92 | 11.32-13.92 | -4 |
| 24 | 10.02 | 8.99 | 11.05 | 8.99-11.05 | -6 |
| 22 | 7.96 | 7.14 | 8.78 | 7.14-8.78 | -8 |
| 20 | 6.32 | 5.67 | 6.97 | 5.67-6.97 | -10 |
| 18 | 5.02 | 4.505 | 5.535 | 4.505-5.535 | -12 |
| 16 | 3.99 | 1.995 | 5.985 | 1.995-5.985 | -14 |

Table 1 illustrates examples of predetermined peak voltage $V_{RF}$ ranges stored in the memory 510 and corresponding to magnitudes of power applied to the antenna 450 and/or magnitudes of power applied to the coupler 440.

Referring to Table 1, for example, when the power applied to the antenna 450 is 34 dBm, the processor 500 may determine whether the peak voltage $V_{RF}$ applied to the antenna 450 and received from the voltage detector 460 is out of the range from about 28.44 V to about 34.96 V.

In operation 703, when it is determined that the peak voltage $V_{RF}$ applied to the antenna 450 is out of the predetermined peak voltage $V_{RF}$ range ("Yes" in operation 702), the processor 500 according to an embodiment may determine that an external object (e.g., a user's body) is in proximity to the electronic device 400. In an example, when an external object is in proximity to the electronic device 400, the impedance of the antenna 450 may be changed due to the external object, and when the impedance of the antenna 450 is changed, the peak voltage $V_{RF}$ applied to the antenna 450 may be out of the predetermined peak voltage $V_{RF}$ range. For example, when an external object is in proximity to the electronic device 400 in the state in which the power applied to the antenna 450 is 34 dBm, the impedance of the antenna 450 may be changed and the peak voltage $V_{RF}$ applied to the antenna 450 may be greater than about 34.96 V or less than about 28.44 V. Accordingly, when it is determined that the peak voltage $V_{RF}$ applied to the antenna 450 is out of the predetermined peak voltage $V_{RF}$ range in operation 702, the processor 500 may determine that an external object is in proximity to the electronic device 400.

In operation 704, the processor 500 according to an embodiment may adjust the magnitude of the power supplied or applied to the antenna 450 based on the determination that the external object is in proximity to the electronic device 400 in operation 703. In an example, the processor 500 may reduce the magnitude of the power supplied or applied to the antenna 450 based on the determination that the external object is in proximity to the electronic device 400. In another example, the processor 500 may reduce electromagnetic waves generated by the electronic device 400 by reducing the magnitude of the power supplied to the antenna 450 in response to the proximity of the external object.

In operation 705, when it is determined that the peak voltage $V_{RF}$ applied to the antenna 450 is not out of the predetermined peak voltage $V_{RF}$ range ("No" in operation 702), the processor 500 according to an embodiment may determine that the external object is not in proximity to the electronic device 400. In an example, when an external object is not in proximity to the electronic device 400, the impedance value of the antenna 450 does not substantially change. Thus, the peak voltage $V_{RF}$ applied to the antenna 450 may not be out of the predetermined peak voltage $V_{RF}$ range. In another example, when it is determined that an external object is not in proximity to the electronic device 400, the processor 500 may maintain the magnitude of the power applied to the antenna 450. According to an embodiment, after operation 705 is performed, operation 706 may be performed. As another example, after operation 705 is performed, the operations may be terminated without performing operation 706, unlike those illustrated in FIG. 7.

In operation 706, the processor 500 according to an embodiment may detect the power applied to the coupler 440 (e.g., the coupler 440 in FIG. 4) electrically connected to the wireless communication circuit 410 using the power detection circuit of the wireless communication circuit 410, and may compare the power data of the detected power applied to the coupler 440 with a predetermined coupler power value.

In an embodiment, the memory 510 may store the predetermined coupler power value corresponding to the power supplied or applied to the antenna 450, and the processor 500 may compare the power data of the power applied to the coupler 440 with the predetermined coupler power value stored in the memory 510. In an example, the processor 500 may determine whether the operation of adjusting the magnitude of the power supplied to the antenna 450 in operation 704 described above has been correctly performed by determining whether the power data of the power applied to the coupler 440 corresponds to the predetermined coupler power value.

Referring to Table 1 above, for example, when the power supplied to the antenna 450 is adjusted from 34 dBm to 32 dBm in operation 704, the processor 440 may determine whether the power applied to the coupler 440 corresponds to about 2 dBm that is a predetermined coupler power value. In an example, when it is determined that the power data of the power applied to the coupler 440 corresponds to the predetermined coupler power value, the processor 500 may determine that the power control operation in operation 704 has been correctly performed. In another example, when the power data of the power applied to the coupler 440 does not correspond to the predetermined coupler power value, the processor 500 may determine that the power control operation in operation 704 has not been correctly performed and may perform operation 704 again.

Figure 8:
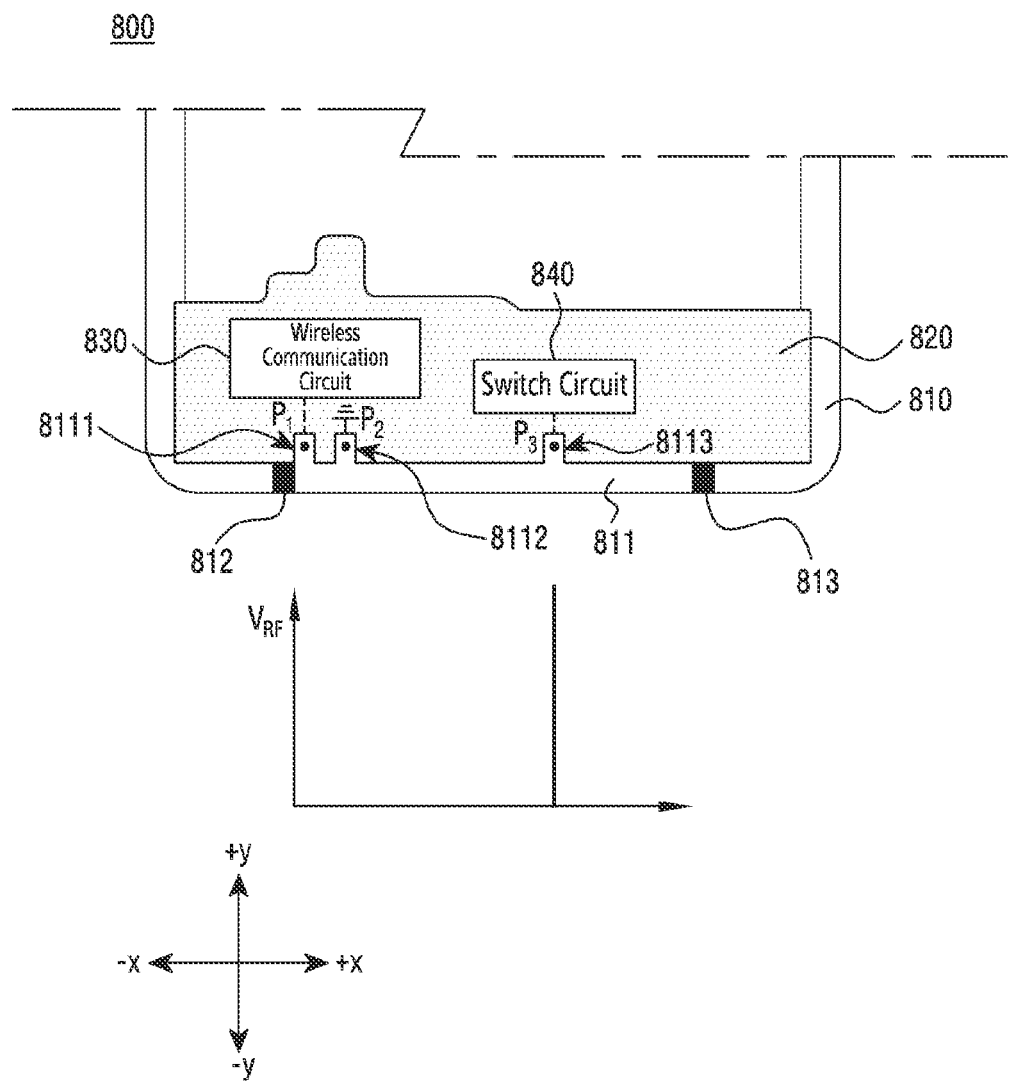
FIG. 8 is a diagram illustrating a partial area of a side member that operates as an antenna radiator of an electronic device according to various embodiments.

FIG. 8 is a diagram illustrating a partial area of a side member that operates as an antenna radiator of an electronic device according to various embodiments.

Referring to FIG. 8, an electronic device 800 (e.g., the electronic device 200 in FIGS. 2A and 2B) according to an embodiment may include a side member (e.g., side wall) 810 (e.g., the side member 218 in FIG. 2A), a printed circuit board 820, a wireless communication circuit 830 (e.g., a wireless communication module 192 in FIG. 1), and/or a switch circuit 840. The electronic device 800 according to an embodiment may be a device obtained by adding the switch circuit 840 to the electronic device 300 of FIG. 3.

According to an embodiment, the side member 810 may include a side wall and define at least a portion of the side surface (e.g., the side surface 210C in FIG. 2A) of the electronic device 800. In an example, the side member 810 may include a conductive portion 811 (e.g., the conductive portion 2181 in FIG. 2A) and/or one or more non-conductive portions 812 and 813 (e.g., the one or more non-conductive portions 2182 and 2183 in FIG. 2A). For example, the one or more non-conductive portions 812 and 813 may include a first non-conductive portion 812 disposed at one end of the conductive portion 811 (e.g., the end in the −x-axis direction) and/or a second non-conductive portion 813 disposed at the other end of the conductive portion 811 (e.g., the end in the +x-axis direction). As another example, the first non-conductive portion 812 and/or the second non-conductive portion 813 may insulate the conductive portion 811. As another example, the portion of the side member 810 that is in contact with the first non-conductive portion 812 and is located in the −x-axis direction of the first non-conductive portion 812 or the portion of the side member 810 that is in contact with the second non-conductive portion 813 and is located in the +x-axis direction of the second non-conductive portion 813 may include a conductive member.

According to an embodiment, the conductive portion 811 of the side member 810 may be electrically connected to a wireless communication circuit 830 and/or a ground of a printed circuit board 820. For example, the conductive portion 811 may be electrically connected to the wireless communication circuit 830 at a first point $P_1$, and may be electrically connected to a ground of the printed circuit board 820 at a second point $P_2$ spaced apart from the first point $P_1$. In an example, the conductive part 811 may operate as an antenna radiator (e.g., an inverted-F antenna (IFA)) that transmits and/or receives an RF signal of a predetermined frequency band through the above-described electrical connection relationship. As another example, depending on the type of the antenna including the conductive portion 811, the conductive portion 811 may not be electrically connected to the ground. For example, in the case of a monopole antenna or a patch antenna, the conductive portion 811 may not be electrically connected to the ground.

In an embodiment, the conductive portion 811 of the side member 810 may be electrically connected to the switch circuit 840. For example, the conductive portion 811 may be electrically connected to the switch circuit 840 at a third point $P_3$ spaced apart from the first point $P_1$ and/or the second point $P_2$. In an example, the switch circuit 840 may be electrically connected to the conductive portion 811 to selectively change the electrical length of the conductive portion 811. For example, the switch circuit 840 may electrically connect the conductive portion 811 to lumped elements (e.g., a capacitor, an inductor, and a resistor) to increase or decrease the electrical length of the conductive portion 811. As another example, the switch circuit 840 may electrically connect the conductive portion 811 to a ground of the printed circuit board 820 or may open the conductive portion 811 in terms of circuit. As the electrical length of the conductive portion 811 is changed by the switch circuit 840, the resonance frequency of the conductive portion 811 may be changed. Although not illustrated in the drawing, the switch circuit 840 may be electrically connected to at least one of the wireless communication circuit 830 or a processor (not illustrated) (e.g., the processor 120 in FIG. 1), and at least one of the wireless communication circuit 830 or the processor may control the operation of the switch circuit 840.

In an embodiment, the conductive portion 811 may include one or more protrusions 8111, 8112, and 8113 protruding toward the printed circuit board 820. For example, the conductive portion 811 may include a first protrusion 8111, a second protrusion 8112 disposed to be spaced apart from the first protrusion 8111, and/or a third protrusion 8113 disposed to be spaced apart from the first protrusion 8111 and the second protrusion 8112. As another example, the first point $P_1$ may be a point corresponding to at least one area of the first protrusion 8111, and the second point $P_2$ may be a point corresponding to at least one area of the second protrusion 8112. As another example, the third point $P_3$ may be a point corresponding to at least one area of the third protrusion 8113, but the first point $P_1$, the second point $P_2$, and/or the third point $P_3$ are not limited to the above-described embodiment.

In an embodiment, since a voltage is supplied or applied from the wireless communication circuit 830 to the conductive part 811 through the first point $P_1$ of the conductive part 811, the peak voltage $V_{RF}$ may be applied to the switch circuit 840 electrically connected to the conductive portion 811.

According to an embodiment, the electronic device 800 may detect the peak voltage $V_{RF}$ applied to the switch circuit 840 electrically connected to the conductive portion 811 operating as an antenna radiator, and may detect whether an external object (e.g., a user's body) is in proximity to the electronic device 800 based on the detected peak voltage $V_{RF}$. The operations of detecting the peak voltage $V_{RF}$ of the electronic device 800 and detecting whether an external object is in proximity to the electronic device 300 will be described in greater detail below.

Figure 9:
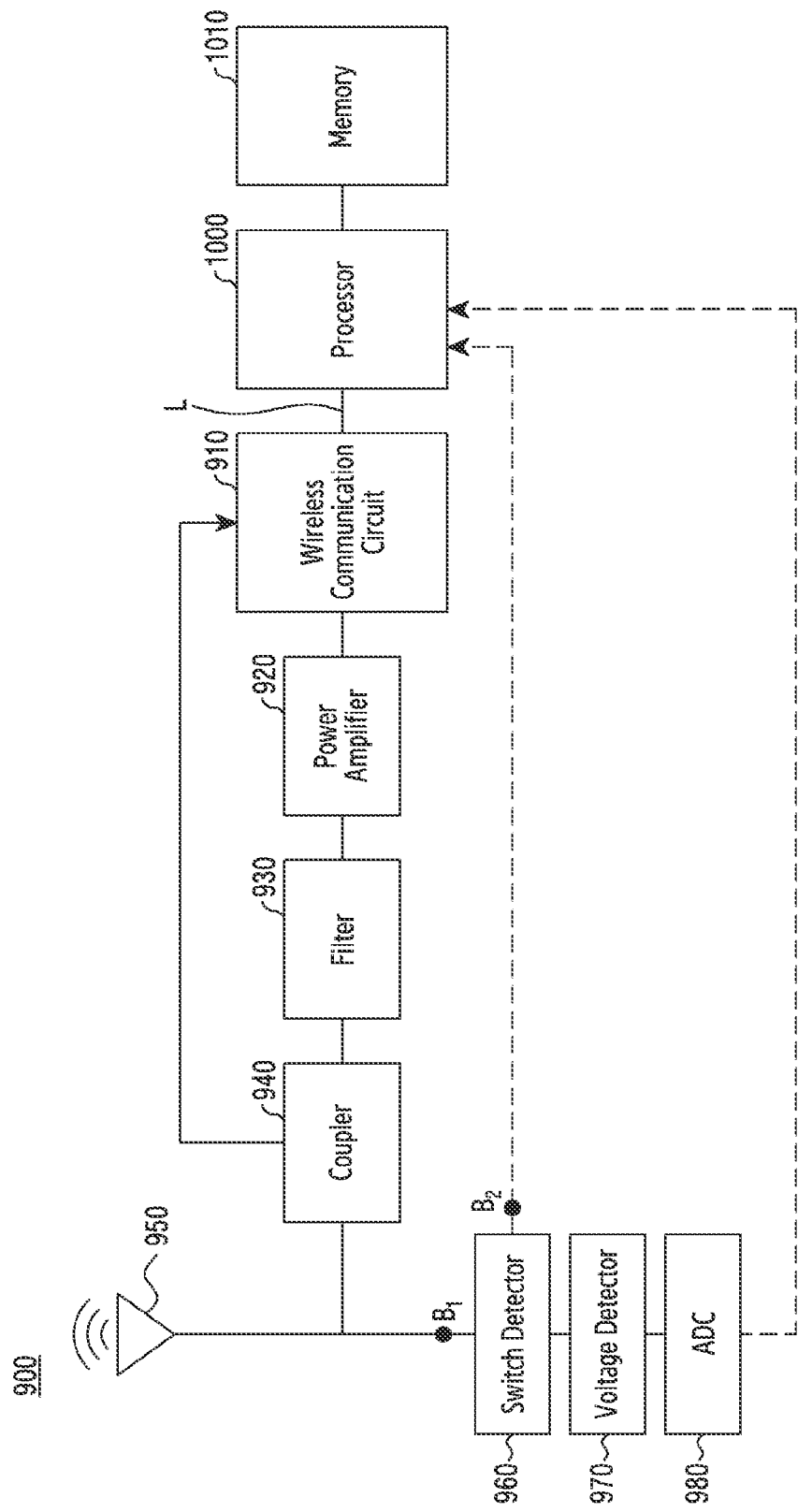
FIG. 9 is a block diagram illustrating an example configuration of an electronic device according to various embodiments.
Figure 10:
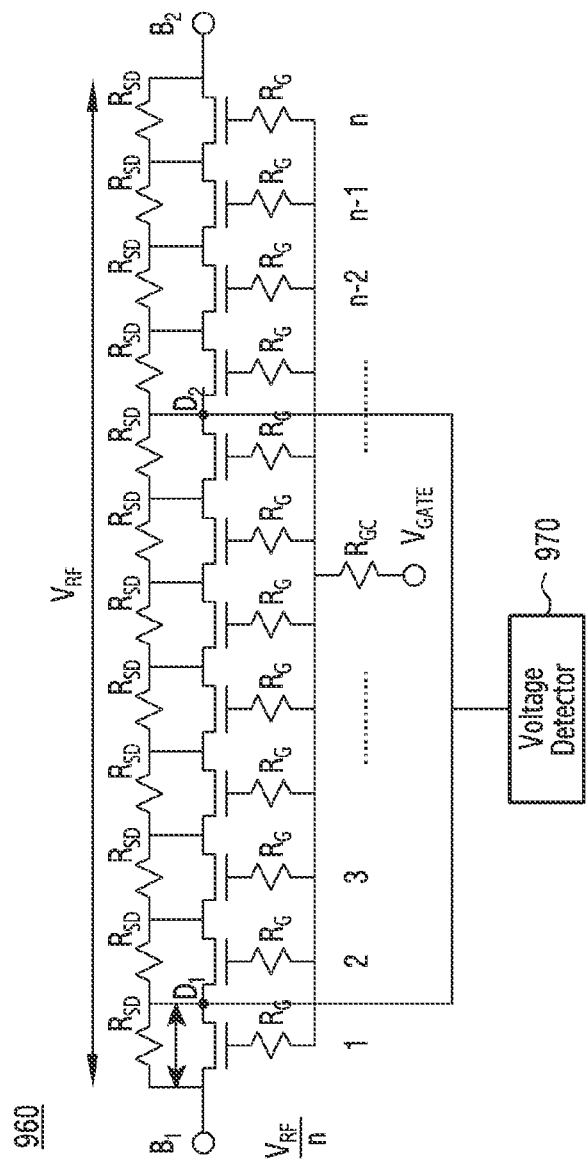
FIG. 10 is a circuit diagram illustrating an example switch circuit of an electronic device according to various embodiments.
Figure 11:
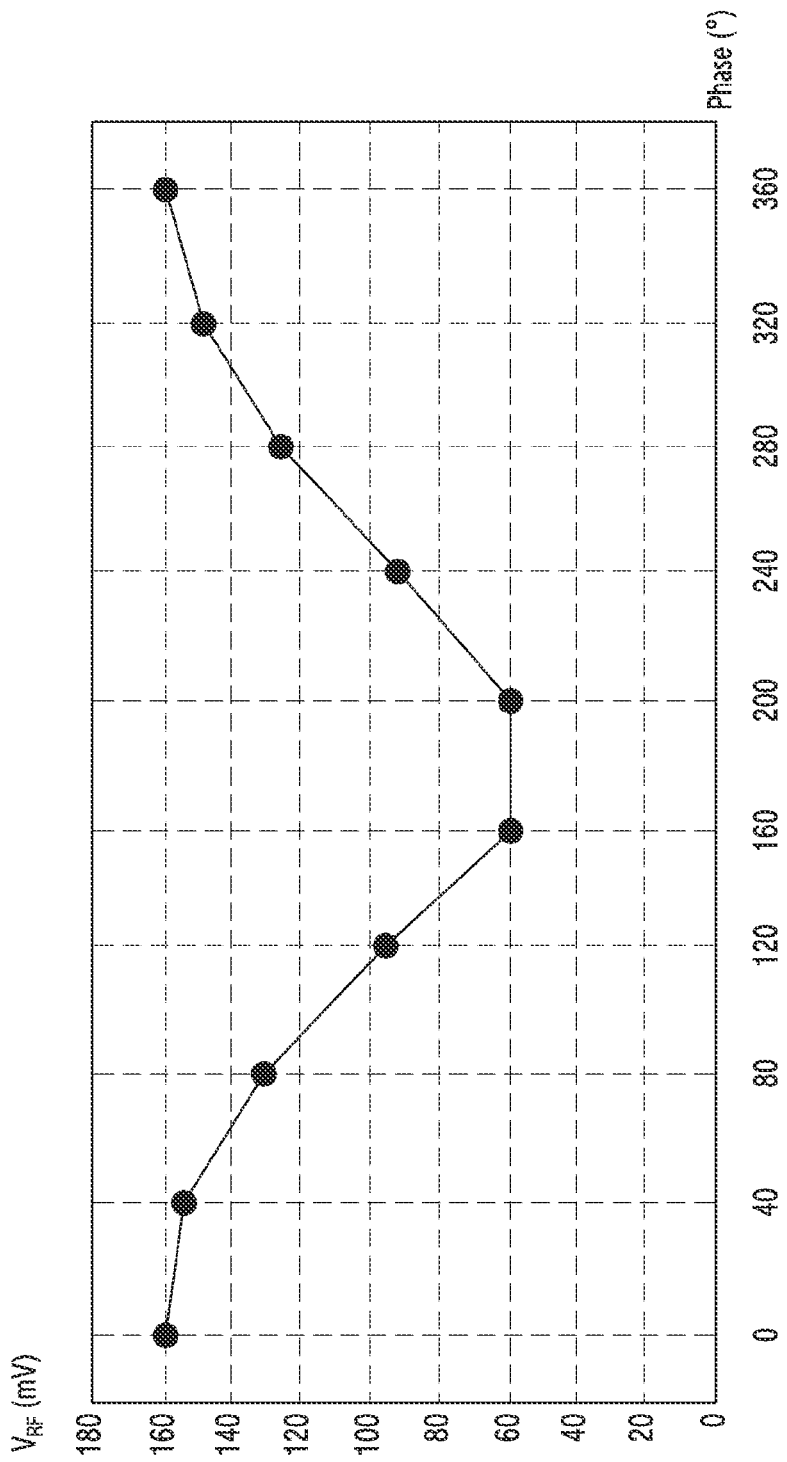
FIG. 11 is a graph illustrating a change in a peak voltage $V_{RF}$ according to a phase change of a voltage applied to an antenna according to various embodiments.

FIG. 9 is a block diagram illustrating an example configuration of an electronic device according to various embodiments, FIG. 10 is a circuit diagram illustrating an example switch circuit of an electronic device according to various embodiments, and FIG. 11 is a graph showing a change in a peak voltage $V_{RF}$ according to a phase change of a voltage applied to an antenna.

Referring to FIGS. 9, 10, and 11, an electronic device 900 (e.g., the electronic device 200 in FIGS. 2A and 2B or the electronic device 800 in FIG. 8) according to an embodiment may include a wireless communication circuit 910 (e.g., the wireless communication circuit 830 in FIG. 8), a power amplifier 920, a filter 930, a coupler 940, an antenna 950, a switch circuit 960 (e.g., the switch circuit 840 in FIG. 8), a voltage detector (e.g., including various circuitry) 970, an analog-to-digital converter (ADC) 980, a processor (e.g., including processing circuitry) 1000 (e.g., the processor 120 in FIG. 1), and/or a memory 1010 (e.g., the memory 130 in FIG. 1).

According to an embodiment, the wireless communication circuit 910 may be electrically connected to the antenna 950 to support wireless communication between the electronic device 900 and an external electronic device (e.g., the electronic device 102 or 104 of FIG. 1). For example, the wireless communication circuit 910 may transmit a radio frequency (RF) signal to an external electronic device by feeding a signal in which power is set to the antenna 950. As another example, the wireless communication circuit 910 may receive an RF signal from an external electronic device through the antenna 950.

According to an embodiment, an electrical path L may be provided between the wireless communication circuit 910 and the antenna 950 to electrically connect the wireless communication circuit 910 and the antenna 950 to each other. On the above-described electrical path L, for example, a power amplifier 920, a filter 930, and/or a coupler 940 may be arranged. In the electronic device 900 according to an embodiment (not illustrated), at least one of the power amplifier 920, the filter 930, or the coupler 940 (e.g., the coupler 940) may be omitted, or another configuration may be added.

In an example, the power amplifier 920 may amplify a signal (hereinafter, an "output signal") in which power output from the wireless communication circuit 910 and applied to the antenna 950 is set, and the output signal amplified by the power amplifier 920 may be transmitted to the antenna 950. In another example, the filter 930 may be located between the antenna 950 and the power amplifier 920 to remove or filter out noise of the output signal amplified through the power amplifier 920.

In an example, the coupler 940 may be electrically connected to the antenna 950 and/or the wireless communication circuit 910, and some of the power supplied or applied to the antenna 950 from the wireless communication circuit 910 may be extracted and feedback to the wireless communication circuit 910. In another example, the coupler 940 may extract at least some of the power applied to the antenna 950, and may feedback the extracted power signal to the wireless communication circuit 910. The wireless communication circuit 910 may receive, for example, a power signal obtained by attracting at least some of the power applied to the antenna 950 from the coupler 940, and may adjust the magnitude of the power supplied or applied to the antenna 950 based on the received power signal.

According to an embodiment, the wireless communication circuit 910 may further include a power detection circuit (not illustrated) electrically connected to the coupler 940. In an example, the wireless communication circuit 910 may detect power applied to the coupler 940 via the power detection circuit. In another example, the wireless communication circuit 910 may transmit power data of the power applied to the sensed coupler 940 to the processor 1000, and the processor 1000 may adjust the magnitude of power applied to the antenna 950 based on the power data received from the wireless communication circuit 910.

According to an embodiment, the antenna 950 may transmit an RF signal to an external electronic device or may receive an RF signal from an external electronic device. In an example, the antenna 950 may, but not exclusively, include a conductive portion (e.g., the conductive portion 311 in FIG. 3) of a side member (e.g., the side member 310 in FIG. 3) that defines at least a portion of the side surface of the electronic device 900. At least a portion of the conductive portion may act as a radiator of the antenna 950. As another example, the antenna 950 may, but not exclusively, include a planar inverted-F antenna (PIFA), a patch antenna, a laser direct structuring (LDS) antenna, or a slot antenna.

According to an embodiment, the switch circuit 960 may be electrically connected to the antenna 950, and the electrical length of the antenna 950 may be changed as the electrical connection state of the switch circuit 960 is changed. For example, a first path $B_1$ may be provided between the switch circuit 960 and the antenna 950 to electrically connect the switch circuit 960 and the antenna 950. In an example, the switch circuit 960 may selectively connect the antenna 950 to a lumped element (e.g., a capacitor, an inductor, or a resistor), or may selectively connect the antenna 950 to a ground (e.g., the ground of the printed circuit board 820 in FIG. 8). In another example, the switch circuit 960 may be electrically connected to the processor 1000, and the processor 1000 may control the electrical connection state of the switch circuit 960. For example, a second path $B_2$ may be provided between the switch circuit 960 and the processor 1000 to electrically connect the switch circuit 960 and the processor 1000. According to an embodiment (not illustrated), the switch circuit 960 may be electrically connected to the wireless communication circuit 910, and the wireless communication circuit 910 may control the electrical connection state of the switch circuit 960.

In an embodiment, the switch circuit 960 may be a switch circuit connected in parallel with the electrical path L between the wireless communication circuit 910 and the antenna 950, but is not limited thereto. According to an embodiment (not illustrated), the switch circuit 960 may be a switch circuit connected in series to the electrical path L.

Referring to FIG. 10, in an embodiment, the switch circuit 960 may be a circuit in which a plurality of field effect transistor (FET) switches are stacked. For example, the switch circuit 960 may be a circuit in which a plurality of FET switches are connected in series. In FIG. 10, $R_{SD}$ and/or $R_G$ may refer, for example, to resistors for applying a voltage to a plurality of FET switches.

In an embodiment, as power is supplied or applied from the wireless communication circuit 910 to the antenna 950, a peak voltage $V_{RF}$ may be applied to the switch circuit 960 electrically connected to the antenna 950. In an example, when the switch circuit 960 is a circuit in which a plurality of FET switches are connected in series, a voltage applied to the switch circuit 960 may be distributed to respective FET switches. For example, when the switch circuit 960 is a circuit in which n FET switches are connected in series, a voltage equal to 1/n of the voltage applied to the entire switch circuit 960 may be applied to each FET switch.

According to an embodiment, the voltage detector 970 may be electrically connected to the switch circuit 960 to detect the peak voltage $V_{RF}$ (e.g., the peak voltage $V_{RF}$ in FIG. 8) applied to the switch circuit 960. In an example, the voltage detector 970 may be the same as or similar to the voltage detector 460 of FIG. 4 and/or the voltage detector 460 of FIG. 5, and redundant descriptions thereof will be omitted below.

Referring to FIG. 10, in an embodiment, the voltage detector 970 may be electrically connected to at least one FET switch among the plurality of FET switches included in the switch circuit 960. In an example, the voltage detector 970 may detect a peak voltage applied to at least one FET switch (e.g., $V_{RF}/n$) among the plurality of FET switches, and based on the detected peak voltage applied to the FET switch, the voltage detector 970 may detect the peak voltage $V_{RF}$ applied to the entire circuit 960. For example, the voltage detector 970 may be electrically connected to the first FET switch at a first point $D_1$ to detect the peak voltage $V_{RF}/n$ applied to the first FET switch, and may detect the peak voltage $V_{RF}$ applied to the entire switch circuit 960 based on the detected peak voltage $V_{RF}/n$ of the first FET switch.

In an embodiment, the voltage detector 970 may be electrically connected to at least two FET switches among the plurality of FET switches included in the switch circuit 960. In an example, the voltage detector 970 may be electrically connected to at least two FET switches among the plurality of FET switches, and may detect the peak voltage $V_{RF}$ applied to the switch circuit 960 and/or a phase change of the voltage applied to the switch circuit 960. For example, the voltage detector 970 may be electrically connected to a first FET switch at a first point $D_1$ and may be electrically connected to a second FET switch at a second point $D_2$. As another example, the voltage detector 970 may detect the peak voltage $V_{RF}$ applied to the entire switch circuit 960 based on the peak voltage $V_{RF}/n$ applied to the first FET switch and/or the second FET switch. As another example, the voltage detector 970 may detect a phase change of the voltage applied to the switch circuit 960 based on a phase difference between the voltages applied to the first FET switch and the second FET switch. In another example, the peak voltage $V_{RF}$ applied to the switch circuit 960 detected via the voltage detector 970 and/or a phase change data of the voltage applied to the switch circuit 960 may be transmitted to the processor 1000 electrically connected to the voltage detector 970.

According to an embodiment, the peak voltage $V_{RF}$ of the switch circuit 960 detected by the voltage detector 970 and/or a phase change data of the voltage applied to the switch circuit 960 may be converted into a digital signal via the analog-to-digital converter 980. In an example, the digital signal converted by the analog-to-digital converter 980 may be transmitted to the processor 1000, and the processor 1000 may acquire the peak voltage $V_{RF}$ applied to the switch circuit 960 and/or phase change data of the voltage applied to the switch circuit 960 based on the digital signal.

According to an embodiment, the processor 1000 may be electrically connected to the wireless communication circuit 910. In an example, the processor 1000 may include various processing circuitry and control wireless communication of the electronic device 900 using the wireless communication circuit 910. For example, the processor 1000 may adjust the magnitude of power supplied to the antenna 950 via the wireless communication circuit 910.

According to an embodiment, the processor 1000 may be electrically connected to the voltage detector 970, and may receive the peak voltage $V_{RF}$ applied to the switch circuit 960 and detected by the voltage detector 970 and/or data about a phase change of the voltage applied to the switch circuit 960.

In an embodiment, the processor 1000 may determine whether an external object is in proximity to the electronic device 900 based on the peak voltage $V_{RF}$ applied to the switch circuit 960 and/or a phase change of the voltage applied to the switch circuit 960. The external object may include, for example, a user's body, but is not limited thereto.

FIG. 11 is a graph illustrating example change of peak voltage $V_{RF}$ applied to the switch circuit 960 according to a phase change of the voltage applied to the switch circuit under the condition in which a voltage standing wave ratio (VSWR) of the antenna 950 is 3:1 and the voltage applied to the switch circuit 960 is constant.

Referring to FIG. 11, it can be seen that the peak voltage $V_{RF}$ applied to the switch circuit 960 is variable due to not only the power supplied or applied to the antenna 950 from the wireless communication circuit 910, but also a phase change of the voltage applied to the switch circuit 960. As a result, the processor 1000 may determine whether an external object is in proximity to the electronic device 900 based on the peak voltage $V_{RF}$ applied to the switch circuit 960 and a phase change of the voltage applied to the switch circuit 960.

In an example, the processor 1000 may be electrically connected to a memory 1010, and the memory 1010 may store data about a magnitude of power applied to the antenna 950 and/or a predetermined peak voltage $V_{RF}$ range of the switch circuit 960 corresponding to the phase of the voltage applied to the switch circuit 960. For example, the memory 1010 may, but not exclusively, store data about the magnitude of power applied to the antenna 950 and/or the predetermined peak voltage $V_{RF}$ range of the switch circuit 960 corresponding to the phase of the voltage applied to the switch circuit 960 in a look-up table.

According to an embodiment, the processor 1000 may detect whether an external object is in proximity to the electronic device by comparing the peak voltage $V_{RF}$ applied to the switch circuit 960 and received from the voltage detector 970 and/or the analog-to-digital converter 980 and the predetermined peak voltage $V_{RF}$ range of the switch circuit 960 stored in the memory 1010. The description, "an external object is in proximity to an electronic device", may include the case in which an external object is disposed at a position adjacent to the electronic device 900 and/or the case in which an external object is in contact with the electronic device 900, and the corresponding descriptions may also be used in the same meaning in the following.

In an example, the processor 1000 may compare the range of the peak voltage $V_{RF}$ applied to the switch circuit 960 and the predetermined peak voltage $V_{RF}$ range, and when it is determined that the peak voltage $V_{RF}$ applied to the switch circuit 960 is out of the predetermined peak voltage $V_{RF}$ range, the processor 1000 may determine that the external object is in proximity to the electronic device 900. For example, when an external object is not in proximity to the electronic device 900, the peak voltage $V_{RF}$ applied to the switch circuit 960 may be included within the predetermined peak voltage $V_{RF}$ range. As another example, when an external object is in proximity to the electronic device 900, the impedance of the antenna 950 may be changed by the external object. As the impedance of the antenna 950 is changed, the peak voltage $V_{RF}$ applied to the switch circuit 960 may be out of the predetermined peak voltage $V_{RF}$ range. According to an embodiment, the electronic device 900 is capable of determining whether an external object is in proximity to the electronic device based on a change in the peak voltage $V_{RF}$ applied to the switch 960 depending on whether the external object is in proximity to the electronic device 900. Thus, the electronic device 900 is capable of detecting whether an external object is in proximity without including a grip sensor.

In an embodiment, the processor 1000 may adjust the magnitude of power supplied to the antenna 950 based on the determination that an external object is in proximity to the electronic device 900. For example, when it is determined that an external object is in proximity to the electronic device 900, the processor 1000 may reduce the magnitude of power supplied or applied to the antenna 950. According to an embodiment, the electronic device 900 may meet the electromagnetic wave absorptance standard (or "specific absorption rate (SAR) standard") through the above-described operation of the processor 1000.

In an embodiment, the processor 1000 may control the switch circuit 960 based on the determination that an external object is in proximity to the electronic device 900. For example, when an external object is in proximity with the electronic device, for impedance matching of the operating frequency of the antenna 950, the processor 1000 may selectively connect the antenna 950 to a lumped element (e.g., a capacitor, an inductor, or a resistor), or may control the switch circuit 960 to selectively connect the antenna 950 to a ground (e.g., the ground of the printed circuit board 820 in FIG. 8).

In an embodiment, the processor 1000 may determine whether the power supplied to the antenna 950 is adjusted based on the power applied to the coupler 940. In an example, the wireless communication circuit 910 may detect power applied to the coupler 940 via a power detection circuit, and power data of the detected power applied to the coupler 940 may be transmitted to the processor 1000. In another example, the processor 1000 may determine whether the power supplied or applied to the antenna 950 has been adjusted by comparing the power data of the power applied to the coupler 940 and received from the wireless communication circuit 910 with a predetermined coupler 940 power value corresponding to the power supplied or applied to the antenna 950. For example, the memory 1010 may store the predetermined coupler 940 power value corresponding to the power applied to the antenna 950, and the processor 1000 may compare the predetermined coupler 940 power value stored in the memory 1010 with the power applied to the coupler 940 and received from the wireless communication circuit 910.

In an example, the processor 1000 may determine whether the magnitude of the power supplied to the antenna 950 has been adjusted to the predetermined magnitude of power by determining whether the power data of the power applied to the coupler 940 corresponds to the predetermined coupler 940 power value stored in the memory 1010 and corresponding to the power applied to the antenna 950. In another example, when it is determined that the power data of the power applied to the coupler 940 does not correspond to the predetermined coupler 940 power value, the processor 1000 may adjust again the magnitude of the power supplied to the antenna 950. For example, the power data may include a magnitude of power.

Figure 12:
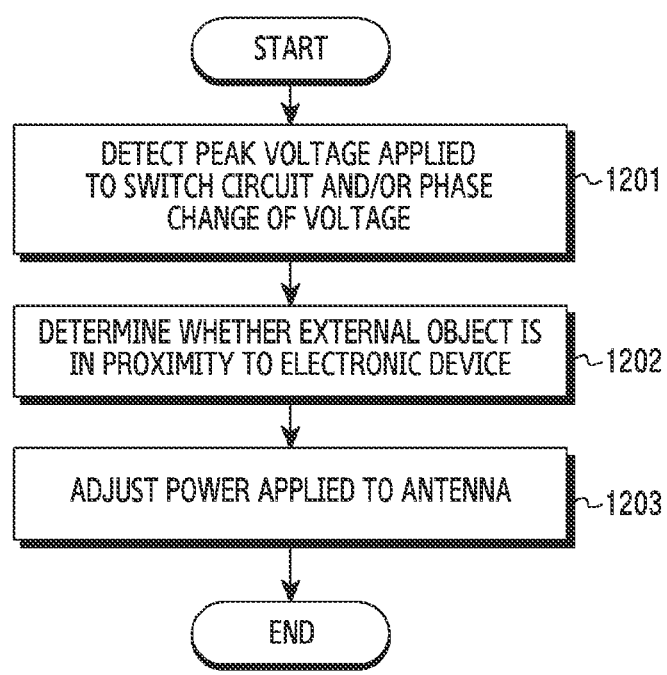
FIG. 12 is a flowchart illustrating an example operation of detecting whether an object is in proximity to an electronic device and adjusting power applied to an antenna according to various embodiments.

FIG. 12 is a flowchart illustrating an example operation of detecting whether an object is in proximity to an electronic device and adjusting power applied to an antenna according to various embodiments. Hereinafter, in describing the operations of detecting whether an object is in proximity to an electronic device and adjusting the power applied to the antenna with reference to FIG. 12, the configuration illustrated in FIG. 9 will be referred to.

Referring to FIG. 12, in operation 1201, the electronic device 900 (e.g., the electronic device 900 in FIG. 9) according to an embodiment may detect the peak voltage $V_{RF}$ applied to the switch circuit 960 (e.g., the switch circuit 960 in FIG. 9) and/or a phase change of the voltage applied to the switch circuit 960 using the voltage detector 970 (e.g., the voltage detector 970 in FIG. 9). In an example, the switch circuit 960 may be electrically connected to the antenna 950 (e.g., the antenna 950 in FIG. 9). In another example, power may be supplied or applied to the antenna 950 via the wireless communication circuit 910 (e.g., the wireless communication circuit 910 in FIG. 9), and as power is supplied to the antenna 950, a voltage may also be applied to the switch circuit 960. In an embodiment, the voltage detector 970 may be electrically connected to the switch circuit 960, and may detect the peak voltage $V_{RF}$ applied to the switch circuit 960 and/or a phase change of the voltage applied to the switch circuit 960. In an example, the peak voltage $V_{RF}$ applied to the switch circuit 960 acquired via the voltage detector 970 and/or a phase change data of the voltage applied to the switch circuit 960 may be transmitted to the processor 1000 (e.g., the processor 1000 in FIG. 9) electrically connected to the voltage detector 970.

In operation 1202, the processor 1000 of the electronic device 900 according to an embodiment may determine whether an external object (e.g., a user's body) is in proximity to the electronic device 900 based on the peak voltage $V_{RF}$ applied to the switch circuit 960 and detected in operation 1201 and/or the data of a phase change of the voltage applied to the switch circuit 960. For example, when an external object is in proximity to the electronic device 900, the impedance value of the antenna 950 may be changed. As another example, as the impedance value of the antenna 950 is changed, the peak voltage $V_{RF}$ applied to the switch circuit 960 electrically connected to the antenna 950 may also be changed.

In an embodiment, the processor 1000 may detect whether an external object is in proximity to the electronic device 900 by comparing the peak voltage $V_{RF}$ applied to the switch circuit 960 with the magnitude of the power stored in the memory 1010 (e.g., the memory 1010 in FIG. 9) and applied to the antenna 950 and/or the predetermined peak voltage $V_{RF}$ range stored in the memory 1010 and corresponding to the phase of the voltage applied to the switch circuit 960. For example, the processor 1000 may determine that an external object is not in proximity to the electronic device 900 when the peak voltage $V_{RF}$ applied to the switch circuit 960 falls within the predetermined peak voltage $V_{RF}$ range. As another example, the processor 1000 may determine that an external object is in proximity with the electronic device 900 when the peak voltage $V_{RF}$ applied to the switch circuit 960 is out of the predetermined peak voltage $V_{RF}$ range. For example, when the peak voltage $V_{RF}$ applied to the switch circuit 960 is greater than the maximum value of the predetermined peak voltage $V_{RF}$ range or less than the minimum value of the predetermined peak voltage $V_{RF}$ range, the processor 1000 may determine that an external object is in proximity to the electronic device 900.

In operation 1203, the processor 1000 of the electronic device 900 according to an embodiment may adjust the power applied to the antenna 950 based on the determination as to whether an external object is in proximity to the electronic device in operation 1202. In an example, when it is determined in operation 1202 that the external object is in proximity to the electronic device 400, the processor 1000 may reduce the magnitude of the power applied to the antenna 950. In another example, when it is determined in operation 1202 that an external object is not in proximity to the electronic device, the processor 1000 may maintain the magnitude of power applied to the antenna 950. According to an embodiment, when an external object is in proximity to the electronic device 900 through operations 1201 to 1203, the electronic device 900 may reduce the power applied to the antenna 950. Accordingly, the electronic device 900 may satisfy the electromagnetic wave absorptance standard (or the "specific absorption rate (SAR) standard").

Figure 13:
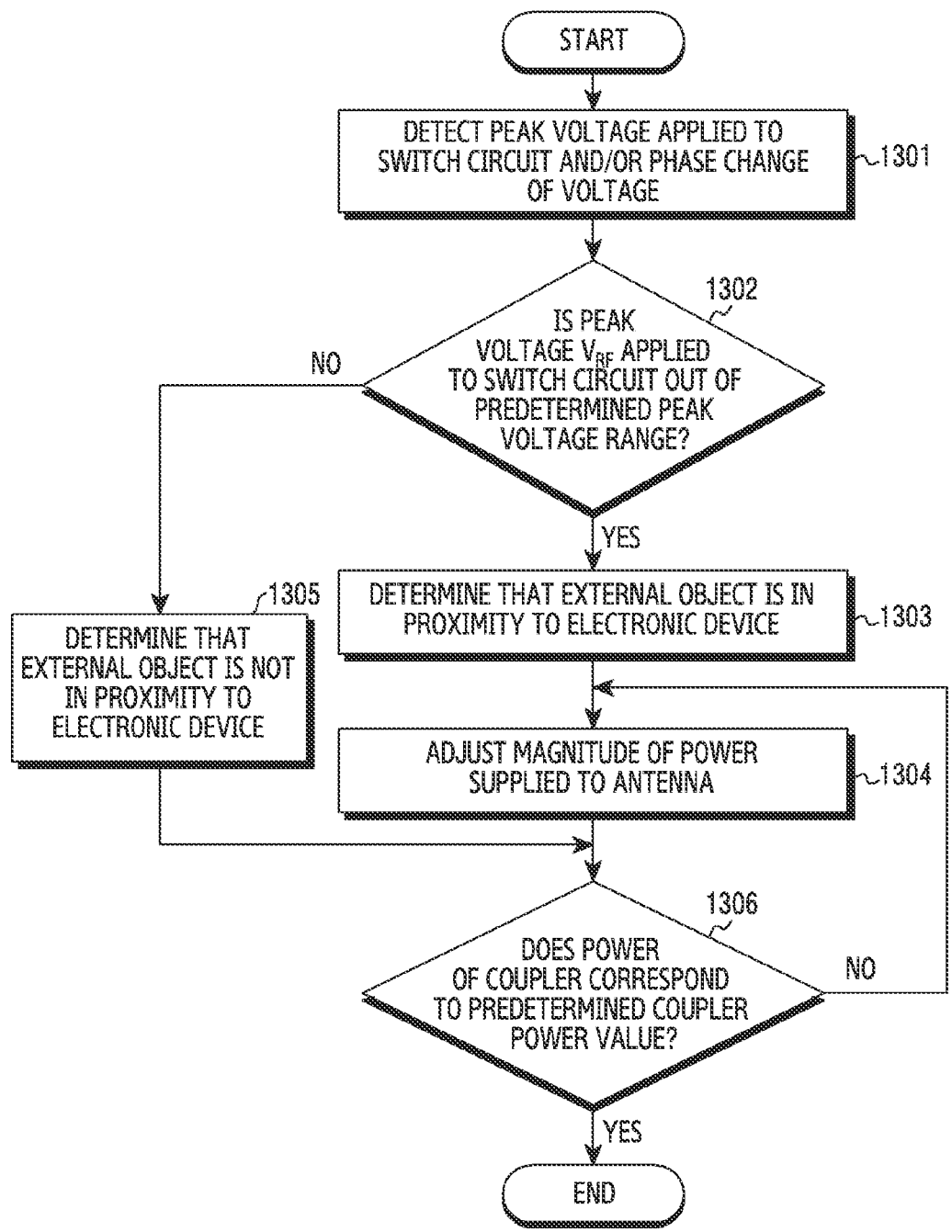
FIG. 13 is a flowchart illustrating an example operation of detecting whether an object is in proximity to an electronic device and adjusting power applied to an antenna according to various embodiments.

FIG. 13 is a flowchart illustrating an example operation of detecting whether an object is in proximity to an electronic device and adjusting power applied to an antenna according to an embodiment. Hereinafter, in describing the operations of detecting whether an external object is in proximity to an electronic device and adjusting the power applied to the antenna with reference to FIG. 13, the configuration illustrated in FIG. 9 described above will be referred to.

Referring to FIG. 13, in operation 1301, the electronic device 900 according to an embodiment may detect the peak voltage $V_{RF}$ applied to the switch circuit 960 (e.g., the switch circuit 960 in FIG. 9) and/or a phase change of the voltage applied to the switch circuit 960 using the voltage detector 970 (e.g., the voltage detector 970 in FIG. 9). In an example, the switch circuit 960 may be electrically connected to the antenna 950 (e.g., the antenna 950 in FIG. 9). In another example, power may be supplied or applied to the antenna 950 via the wireless communication circuit 910 (e.g., the wireless communication circuit 910 in FIG. 9), and as power is supplied to the antenna 950, a voltage may also be applied to the switch circuit 960. In an example, the voltage detector 970 may be electrically connected to the switch circuit 960, and may detect the peak voltage $V_{RF}$ applied to the switch circuit 960 and/or a phase change of the voltage applied to the switch circuit 960. Since operation 1301 is substantially the same as or similar to operation 1201 of FIG. 12, redundant descriptions thereof will be omitted.

In operation 1302, the processor 1000 (e.g., the processor 1000 in FIG. 9) of the electronic device 900 according to an embodiment may compare the peak voltage $V_{RF}$ applied to the switch circuit 960 and detected in operation 1301 with the magnitude of the power applied to the antenna 950 and/or the predetermined peak voltage $V_{RF}$ range of the switch circuit 960 corresponding to a phase of the power applied to the switch circuit 960.

In an example, the processor 1000 may be electrically connected to a memory 1010 (e.g., the memory 1010 in FIG. 9), and the memory 1010 may store data about a magnitude of power applied to the antenna 950 and/or a predetermined peak voltage $V_{RF}$ range of the switch circuit 960 corresponding to the phase of the voltage applied to the switch circuit 960. In an example, the processor 1000 may compare the peak voltage $V_{RF}$ applied to the switch circuit 960 and detected via the voltage detector 970 with the predetermined peak voltage $V_{RF}$ range of the switch circuit 960 stored in the memory 1010, and may determine whether the peak voltage $V_{RF}$ applied to the switch circuit 960 is out of the predetermined peak voltage $V_{RF}$ range. Since operation 1302 may be substantially the same as or similar to operation 1202 of FIG. 12, redundant descriptions thereof will be omitted.

In operation 1303, when it is determined that the peak voltage $V_{RF}$ applied to the switch circuit 960 is out of the predetermined peak voltage $V_{RF}$ range ("Yes" in operation 1302), the processor 1000 according to an embodiment may determine that an external object (e.g., a user's body) is in proximity to the electronic device 900. In an example, when an external object is in proximity to the electronic device 900, the impedance of the antenna 950 may be changed by the external object. In another example, when the impedance of the antenna 950 is changed, the voltage applied to the antenna 950 may be changed, and the voltage applied to the switch circuit 960 electrically connected to the antenna 950 may also be changed. Accordingly, when an external object is in proximity to the electronic device 900, the peak voltage $V_{RF}$ applied to the switch circuit 960 may be out of the predetermined peak voltage $V_{RF}$ range. Accordingly, when it is determined that the peak voltage $V_{RF}$ applied to the switch circuit 960 is out of the predetermined the peak voltage $V_{RF}$ range in operation 1302, the processor 1000 may determine that an external object is in proximity to the electronic device 900.

In operation 1304, the processor 1000 according to an embodiment may adjust the magnitude of the power supplied or applied to the antenna 950 based on the determination that the external object is in proximity to the electronic device 900 in operation 1303. In an example, the processor 1000 may reduce the magnitude of the power supplied or applied to the antenna 950 based on the determination that the external object is in proximity to the electronic device 900. In another example, the processor 1000 may reduce electromagnetic waves generated by the electronic device 900 by reducing the magnitude of the power supplied to the antenna 950 in response to the proximity of the external object.

In operation 1305, when it is determined that the peak voltage $V_{RF}$ applied to the switch circuit 960 is not out of the predetermined the peak voltage $V_{RF}$ range ("No" in operation 1302), the processor 1000 according to an embodiment may determine that the external object is not in proximity to the electronic device 900. In an example, when an external object is not in proximity to the electronic device 900, the impedance value of the antenna 950 does not substantially change. Thus, the peak voltage $V_{RF}$ applied to the switch circuit electrically connected to the antenna 950 may not be out of the predetermined peak voltage $V_{RF}$ range. In another example, when it is determined that an external object is not in proximity to the electronic device 900, the processor 1000 may maintain the magnitude of the power applied to the antenna 950. According to an embodiment, after operation 1305 is performed, operation 1306 may be performed. As another example, after operation 1305 is performed, the operations may be terminated without performing operation 1306, unlike those illustrated in FIG. 13.

In operation 1306, the processor 1000 according to an embodiment may detect the power applied to the coupler 940 (e.g., the coupler 940 in FIG. 9) electrically connected to the wireless communication circuit 910 using the power detection circuit of the wireless communication circuit 910, and may compare the power data of the detected power applied to the coupler 940 with a predetermined coupler power value.

In an embodiment, the memory 1010 may store the predetermined coupler power value corresponding to the power supplied or applied to the antenna 950, and the processor 1000 may compare the power data of the power applied to the coupler 940 with the predetermined coupler power value stored in the memory 1010. In an example, the processor 1000 may determine whether the operation of adjusting the magnitude of the power supplied to the antenna 950 in operation 1304 described above has been correctly performed by determining whether the power data of the power applied to the coupler 940 corresponds to the predetermined coupler power value. For example, when the processor 1000 has adjusted the power supplied to the antenna 950 from a first power value to a second power value in operation 1304, the processor 1000 may determine whether the power data of the power applied to the coupler 940 coincides with the coupler power value corresponding to the second power value. In an example, when it is determined that the power data of the power applied to the coupler 940 corresponds to the predetermined coupler power value, the processor 1000 may determine that the power control operation in operation 1304 has been correctly performed. In another example, when the power data of the power applied to the coupler 940 does not correspond to the predetermined coupler power value, the processor 1000 may determine that the power control operation in operation 1304 has not been correctly performed and may perform operation 1304 again.

According to an embodiment, through operations 1301, 1303, 1304, 1305 and 1306 described above, the electronic device 900 may detect whether an external object is in proximity to the electronic device 900 without using or including a grip sensor. In an example, since the electronic device 900 does not include a grip sensor, it is possible to secure a space in which electronic components are capable of being disposed in the electronic device 900. In another example, a grip sensor may be electrically connected to the antenna (e.g., the antenna 950 of FIG. 9) of the electronic device 900, and may use an antenna as a kind of electrode. Thus, the radiation performance of the antenna may be degraded during the operation of the grip sensor. According to an embodiment, since the electronic device 900 does not include a grip sensor, it is possible to suppress degradation of antenna performance due to the grip sensor, and as a result, it is possible to improve antenna radiation performance.

An electronic device according to an example embodiment may include: a wireless communication circuit; an antenna electrically connected to the wireless communication circuit and configured to be fed with power from the wireless communication circuit at a first point; a voltage detector including circuitry configured to detect a peak voltage applied to the antenna; and a processor electrically connected to the voltage detector and the wireless communication circuit. The processor may be configured to: determine whether an object is within a specified proximity to the electronic device based on the peak voltage detected by the voltage detector; and control the magnitude of power applied to the antenna via the wireless communication circuit based on a determination that the object is within the specified proximity to the electronic device.

In the above-described example embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been illustrated and described with reference to various example embodiments it will be understood that the various example embodiments are intended to be illustrative, not limiting. It will be further understood by those skilled in the art that various modifications and changes may be made thereto without departing from the true spirit and full scope of the disclosure, including the appended claims and equivalents thereof.

What is claimed is:

1. An electronic device comprising:
   a wireless communication circuit;
   an antenna electrically connected to the wireless communication circuit and configured to be fed with power from the wireless communication circuit at a first point;
   a voltage detector including circuitry configured to detect a peak voltage applied to the antenna;
   memory storing instructions; and
   a processor, comprising processing circuitry, electrically connected to the voltage detector and the wireless communication circuit, configured to:
   determine whether an external object is within a specified proximity to the electronic device based on data about the peak voltage detected by the voltage detector and data about a phase change of a voltage applied to the antenna; and
   control a magnitude of power applied to the antenna via the wireless communication circuit based on a determination that the external object is within the specified proximity to the electronic device,
   wherein the voltage detector is disposed between the antenna and an ADC (analog-to-digital converter),
   wherein the voltage detector is configured to provide the data about the detected peak voltage and the data about the phase change of the voltage detected by the voltage detector to the ADC, and
   wherein the ADC is configured to convert the provided data about peak voltage and the data about the phase change of the voltage detected by the voltage detector to a digital signal and provide the digital signal to the processor.

2. The electronic device of claim 1, wherein the instructions, when executed by the processor, cause the electronic device to:
   reduce the magnitude of power applied to the antenna via the wireless communication circuit based on the determination that the object is in proximity to the electronic device.

3. The electronic device of claim 1,
   wherein thea memory is electrically connected to the processor and stores a predetermined peak voltage range corresponding to the magnitude of the power applied to the antenna.

4. The electronic device of claim 3, wherein the instructions, when executed by the processor, cause the electronic device to:
   compare the data about the peak voltage detected by the voltage detector with the predetermined peak voltage range stored in the memory; and
   determine whether the external object is within the specified proximity with respect to the electronic device.

5. The electronic device of claim 3, further comprising:
   a coupler electrically connected to the antenna and the wireless communication circuit,
   wherein the coupler is configured to feedback a power value applied thereto to the wireless communication circuit.

6. The electronic device of claim 5, wherein the wireless communication circuit comprises a power detection circuit configured to detect the power value applied to the coupler.

7. The electronic device of claim 6, wherein the stores a predetermined power value applied to the coupler and corresponding to the magnitude of the power applied to the antenna.

8. The electronic device of claim 7, wherein the instructions, when executed by the processor, cause the electronic device to:
   receive the power value of the coupler detected from the wireless communication circuit via the power detection circuit; and
   determine whether the magnitude of the power applied to the antenna has been adjusted by comparing the received power value of the coupler and a predetermined power value of the coupler stored in the memory.

9. The electronic device of claim 1, wherein the antenna is electrically connected to a ground at a second point different from the first point.

10. TheAn electronic device of claim 1, further comprising:
    a switch circuit which comprises a plurality of field effect transistor (FET) switches connected in series,
    wherein the voltage detector is electrically connected to at least one FET switch among the plurality of FET switches, and the voltage detector is configured to detect the peak voltage applied to the switch circuit based on a voltage applied to the at least one FET switch.

11. The electronic device of claim 10, wherein the voltage detector is electrically connected to at least two FET switches among the plurality of FET switches, and the voltage detector is configured to detect the peak voltage applied to the switch circuit and the phase change of the voltage applied to the switch circuit based on a voltage applied to the at least two FET switches, wherein the instructions, when executed by the processor (500), cause the electronic device to:

determine whether the external object is within the specified proximity to the electronic device based on the data about the peak voltage applied to the switch circuit and detected via the voltage detector and the data about the phase change of the voltage applied to the switch circuit.

12. A method of detecting whether an external object is within a specified proximity to an electronic device, the method comprising:

detecting a peak voltage applied to an antenna via a voltage detector;

determining whether the external object is within the specified proximity to the electronic device based on data about the detected peak voltage and data about a phase change of a voltage detected by the voltage detector;

adjusting a magnitude of power applied to the antenna via a wireless communication circuit electrically connected to the antenna based on a determination that the external object is within the specified proximity to the electronic device, and wherein the voltage detector is disposed between the antenna and an ADC (analog-to-digital converter), wherein the voltage detector provides the data about the detected peak voltage and the data about the phase change of the voltage detected by the voltage detector to the ADC, wherein the ADC converts the provided data about the peak voltage and the data about the phase change of the voltage detected by the voltage detector to a digital signal and provide the digital signal to the processor.

13. The method of claim 12, wherein the adjusting of the magnitude of the power applied to the antenna comprises:

reducing the magnitude of the power applied to the antenna based on determining that the external object is within the specified proximity to the electronic device.

14. The method of claim 12, wherein the determining of whether the external object is within the specified proximity to the electronic device comprises:

comparing the data about the peak voltage detected via the voltage detector and a predetermined peak voltage range stored in the memory corresponding to the magnitude of the power applied to the antenna.

15. The method of claim 14, wherein the determining of whether the external object is within the specified proximity to the electronic device comprises:

determining that the external object is within the specified proximity to the electronic device based on determining that the data about the peak voltage detected via the voltage detector is out of the predetermined peak voltage range.

* * * * *